United States Patent
Kihara et al.

(10) Patent No.: US 10,142,350 B2
(45) Date of Patent: Nov. 27, 2018

(54) INFORMATION PROCESSING APPARATUS PERMITTING EXECUTION OF AN APPLICATION PROGRAM BY A TERMINAL APPARATUS BASED ON A LOCATION OF THE TERMINAL APPARATUS, AND INFORMATION PROCESSING METHOD OF PERMITTING THE APPLICATION PROGRAM TO BE EXECUTED BY THE TERMINAL APPARATUS BASED ON A LOCATION OF THE TERMINAL APPARATUS

(71) Applicant: FUJITSU LIMITED, Kawasaki-shi, Kanagawa (JP)

(72) Inventors: Hideto Kihara, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 609 days.

(21) Appl. No.: 14/248,441

(22) Filed: Apr. 9, 2014

(65) Prior Publication Data

US 2014/0359102 A1 Dec. 4, 2014

(30) Foreign Application Priority Data

May 28, 2013 (JP) .................................. 2013-112099

(51) Int. Cl.
*G06F 15/16* (2006.01)
*H04L 29/06* (2006.01)
*H04W 4/20* (2018.01)

(52) U.S. Cl.
CPC .......... *H04L 63/107* (2013.01); *H04L 63/108* (2013.01); *H04W 4/20* (2013.01)

(58) Field of Classification Search
CPC ...... H04L 67/10; H04L 1/24; G06F 67/30867
See application file for complete search history.

(56) References Cited

U.S. PATENT DOCUMENTS 6,278,882 B1 * 8/2001 Choi .................... H04W 52/343
455/436
8,392,282 B2 * 3/2013 Nagasaka .............. G06Q 10/10
705/26.7

(Continued)

FOREIGN PATENT DOCUMENTS

JP 2003-303151 10/2003
JP 2011-258086 12/2011

*Primary Examiner* — Moustafa M Meky
*Assistant Examiner* — Sm Z Islam
(74) *Attorney, Agent, or Firm* — Staas & Halsey LLP

(57) ABSTRACT

An information processing apparatus includes a memory and a processor configured to transmit an application to a terminal apparatus in accordance with information regarding a status, the information including at least one of location information of the terminal apparatus and time information, permit the terminal apparatus to execute a plurality of functions of the application, the plurality of functions including a first function and a second function when the status identified by the information regarding the status matches a first condition that specifies at least one of and a first location range a first time range, and permit the terminal apparatus to execute the first function and prohibit the terminal apparatus to execute the second function, when the status identified by the information regarding the status does not match the first condition and matches a second condition that specifies a second time range or a second location range.

21 Claims, 35 Drawing Sheets

(56) References Cited

U.S. PATENT DOCUMENTS

| | | | | |
|---|---|---|---|---|
| 2006/0022846 | A1* | 2/2006 | Tummala | G06F 17/30241 340/995.1 |
| 2008/0034217 | A1* | 2/2008 | McQuaide | H04B 1/202 713/186 |
| 2010/0191756 | A1* | 7/2010 | Terao et al. | G06F 17/30209 707/758 |
| 2011/0320119 | A1* | 12/2011 | Jerez Morales | G01C 21/20 701/516 |
| 2012/0254357 | A1* | 10/2012 | Kawakami | H04N 21/234309 709/217 |
| 2012/0260333 | A1* | 10/2012 | Uchikawa | G06F 21/84 726/17 |
| 2013/0086577 | A1* | 4/2013 | Nakashima | H04N 21/25808 717/178 |
| 2013/0173067 | A1* | 7/2013 | Kaneko | G05D 23/19 700/276 |

* cited by examiner

FIG. 3

DELIVERY-APPLICATION REGISTRATION DB

| No | USER ID | TERMINAL ID | APPLICATION NAME | DELIVERY STATE | APPLICATION DATA |
|---|---|---|---|---|---|
| 1 | User001 | T081 | MEETING APPLICATION A | DELIVERED | ... |
| 2 | User001 | T081 | SCHEDULE APPLICATION | DELIVERED | ... |
| 3 | User001 | T081 | ACCOUNTING APPLICATION | UN-DELIVERED | ... |
| ... | ... | ... | ... | ... | ... |

DELIVERY-POLICY MANAGEMENT DB

| No | USER ID | TERMINAL ID | APPLICATION NAME | DELIVERED POLICY |
|---|---|---|---|---|
| 1 | User001 | T081 | MEETING APPLICATION A | ALL-FUNCTION PERMISSION POLICY |
| 2 | User001 | T081 | SCHEDULE APPLICATION | PARTIAL-FUNCTION PERMISSION POLICY |
| 3 | User001 | T081 | ACCOUNTING APPLICATION | UN-DELIVERED |
| ... | ... | ... | ... | ... |

FIG. 5

PERMISSION-CONDITION DB                                22

| No | APPLICATION NAME | ENABLE-USE CONDITION | ALL-FUNCTION PERMISSION CONDITION |
|---|---|---|---|
| 1 | MEETING APPLICATION A | LOCATION IS INSIDE COMPANY | LOCATION IS INSIDE MEETING ROOM, AND TIME IS WITHIN MEETING TIME (16:00 TO 17:00) |
| 2 | DOCUMENT APPLICATION FOR CLIENT C | LOCATION IS WITHIN 100 M FROM PERIMETER OF CLIENT'S PLACE C | LOCATION IS WITHIN PERIMETER OF CLIENT'S PLACE C |
| 3 | MATERIAL APPLICATION FOR VISITOR a | LOCATION IS INSIDE COMPANY | LOCATION IS INSIDE RECEPTION ROOM J, AND TIME IS WITHIN VISITOR-RECEIVING TIME (13:30 TO 15:30) |
| 4 | MATERIAL APPLICATION FOR VISITOR b | LOCATION IS INSIDE COMPANY | LOCATION IS INSIDE RECEPTION ROOM K, AND TIME IS WITHIN VISITOR-RECEIVING TIME (16:00 TO 17:30) |
| 5 | MEETING APPLICATION B | LOCATION IS SITE D | LOCATION IS SITE D, AND TERMINAL WAS AT SITE C WITHIN PAST 8 HOURS |
| 6 | EVENT-X APPLICATION | LOCATION IS INSIDE EVENT-X VENUE | LOCATION IS INSIDE EVENT-X VENUE, AND NUMBER OF TERMINALS IS LESS THAN 1000 |
| 7 | EVENT-X APPLICATION | LOCATION IS INSIDE EVENT-X VENUE | LOCATION IS INSIDE EVENT-X VENUE |
| ... | ... | ... | ... |

FIG. 6

PARTIAL-FUNCTION-PERMISSION-POLICY DB

| No | APPLICATION NAME | USER ID | TERMINAL ID | PARTIAL-FUNCTION PERMISSION CONDITION | FUNCTION1 FILE READ | FUNCTION2 FILE WRITE | FUNCTION3 CAMERA | FUNCTION4 SOUND RECORDING | FUNCTION5 RECEPTION FROM SERVER | FUNCTION6 TRANSMISSION TO SERVER |
|---|---|---|---|---|---|---|---|---|---|---|
| 1 | MEETING APPLICATION A | User001 | T081 | WITHIN 30 MINUTES BEFORE START AND AFTER END OF MEETING | ○ | × | × | × | | |
| 2 | MATERIAL APPLICATION FOR VISITOR a | User001 | T081 | WITHIN 10 MINUTES BEFORE START AND AFTER END OF VISITOR RECEPTION | ○ | × | ○ | ○ | | |
| 3 | MATERIAL APPLICATION FOR VISITOR a | User001 | T081 | WITHIN 5 M IN VICINITY OF RECEPTION ROOM J | ○ | ○ | × | × | | |
| 4 | MATERIAL APPLICATION FOR VISITOR b | User001 | T081 | WITHIN 30 MINUTES BEFORE START AND AFTER END OF VISITOR RECEPTION | ○ | × | ○ | ○ | | |
| 5 | MATERIAL APPLICATION FOR VISITOR b | User001 | T081 | WITHIN 3 M IN VICINITY OF RECEPTION ROOM K | ○ | × | × | × | | |
| 6 | MEETING APPLICATION A | User001 | T081 | TIME IS WITHIN 30 MINUTES BEFORE START AND AFTER END OF MEETING | ○ | ○ | ○ | ○ | | |
| 7 | MEETING APPLICATION A | User001 | T081 | LOCATION IS WITHIN 3 M FROM PERIMETER OF MEETING ROOM | ○ | ○ | × | × | | |
| 8 | MEETING APPLICATION A | User001 | T081 | (AND CONDITION OF Nos. 6 AND 7) | ○ | × | × | × | | |
| 9 | MEETING APPLICATION B | User001 | T081 | LOCATION IS SITE D | ○ | ○ | ○ | ○ | | |
| 10 | EVENT-X APPLICATION | User001 | T081 | NUMBER OF TERMINALS IN EVENT-X VENUE IS 1000 OR MORE | ○ | ○ | ○ | ○ | ○ | × |
| 11 | EVENT-X APPLICATION | User001 | T081 | LOCATION IS 53 M FROM EVENT VENUE | ○ | ○ | ○ | ○ | ○ | ○ |
| 12 | EVENT-X APPLICATION | User003 | T021 | LOCATION IS 39 M FROM EVENT VENUE | ○ | ○ | ○ | ○ | ○ | ○ |
| 13 | EVENT-X APPLICATION | User009 | T051 | LOCATION IS 68 M FROM EVENT VENUE | ○ | ○ | ○ | ○ | ○ | ○ |

FIG. 7

NUMBER-OF-API-CALLS DB

| No | APPLICATION NAME | API | PERMISSION INFORMATION | NUMBER OF CALLS |
|---|---|---|---|---|
| 1 | MEETING APPLICATION A | FILE READ | PERMITTED | 5 |
| 2 | MEETING APPLICATION A | FILE WRITE | UN-PERMITTED | 2 |
| ... | ... | ... | ... | ... |

USER-STATUS DB

| No | USER-STATUS TYPE | CURRENT STATUS |
|---|---|---|
| 1 | STATUS INSIDE/OUTSIDE COMPANY | INSIDE COMPANY |
| 2 | STATUS INSIDE/OUTSIDE MEETING ROOM | INSIDE MEETING ROOM |
| 3 | TIME SLOT | BETWEEN 16:00 AND 17:00 |
| 4 | LONGITUDE AND LATITUDE OF CURRENT LOCATION | XX° YY' ZZ" |
| 5 | LOCATION | SITE A |
| 6 | STATUS WHILE TRAVELING BY TRAIN | No |
| 7 | STATUS INSIDE/OUTSIDE EVENT-X VENUE | OUTSIDE VENUE |
| 8 | PREDICTED TIME OF ENTRY TO EVENT-X VENUE | 16:32 |
| ... | ... | ... |

FIG. 21

EXCLUSIVE SWITCHING CONDITION DB 53

| No | USER ID | TERMINAL ID | APPLICATION NAME | EXCLUSIVE SWITCHING CONDITION |
|---|---|---|---|---|
| 1 | User001 | T081 | MATERIAL APPLICATION FOR VISITOR b | TIME IS AFTER 15:50 |
| 2 | User001 | T081 | MATERIAL APPLICATION FOR VISITOR b | LOCATION IS AT 4 M FROM RECEPTION ROOM J |
| ... | ... | ... | ... | ... |

FIG. 22

EXCLUSIVE SWITCHING CONDITION DB                                    18A

| No | USER ID | TERMINAL ID | APPLICATION NAME | EXCLUSIVE TAG | DELIVERY STATE |
|---|---|---|---|---|---|
| 1 | User001 | T081 | MEETING APPLICATION A | | DELIVERED |
| 2 | User001 | T081 | SCHEDULE APPLICATION | | DELIVERED |
| 3 | User001 | T081 | ACCOUNTING APPLICATION | | UN-DELIVERED |
| 4 | User001 | T081 | MATERIAL APPLICATION FOR VISITOR a | MATERIAL FOR VISITOR | UN-DELIVERED |
| 5 | User001 | T081 | MATERIAL APPLICATION FOR VISITOR b | MATERIAL FOR VISITOR | UN-DELIVERED |
| 6 | User002 | T015 | FIELDWORK AID APPLICATION P | FIELDWORK AID | UN-DELIVERED |
| 7 | User002 | T015 | FIELDWORK AID APPLICATION Q | FIELDWORK AID | UN-DELIVERED |
| ... | ... | ... | ... | ... | ... |

FIG. 26

USER-STATUS HISTORY DB 55

| No | DATE AND TIME | USER-STATUS TYPE | USER STATUS |
|---|---|---|---|
| 1 | 2013-03-12T07:18:01 | LOCATION | SITE A |
| 2 | 2013-03-12T08:24:33 | LOCATION | SITE B |
| 3 | 2013-03-12T10:35:29 | LOCATION | SITE C |
| 4 | 2013-03-12T11:47:21 | LOCATION | SITE D |
| ... | ... | ... | ... |

APPLICATION-TRANSFER-TIME DB

| No | TERMINAL ID | APPLICATION NAME | TRANSFER SIZE | TRANSFER TIME |
|---|---|---|---|---|
| 1 | T081 | MEETING APPLICATION A | 521KB | 5 SECONDS |
| 2 | T082 | MEETING APPLICATION B | 605KB | 6 SECONDS |
| ... | ... | ... | ... | ... |

APPLICATION-TRANSFER-TIME DB

| No | APPLICATION NAME | TRANSFER SIZE | TRANSFER TIME |
|---|---|---|---|
| 1 | MEETING APPLICATION A | 521KB | 5 SECONDS |
| 2 | MEETING APPLICATION B | 605KB | 6 SECONDS |
| ... | ... | ... | ... |

FIG. 33

PREDICTED-NUMBER-OF-SIMULTANEOUS-ENTRY-TERMINALS DB 59

| No | TIME SLOT | PREDICTED NUMBER OF SIMULTANEOUS-ENTRY TERMINALS | TERMINAL ID LIST |
|---|---|---|---|
| 1 | 15:00-15:29 | 31 | T135,··· |
| 2 | 15:30-15:59 | 45 | T981,··· |
| 3 | 16:00-16:29 | 120 | T199,··· |
| 4 | 16:30-16:59 | 187 | T081,T021,T051··· |
| 5 | 17:00-17:29 | 133 | T008,··· |
| 6 | 17:30-17:59 | 109 | T710,··· |
| ··· | ··· | ··· | ··· |

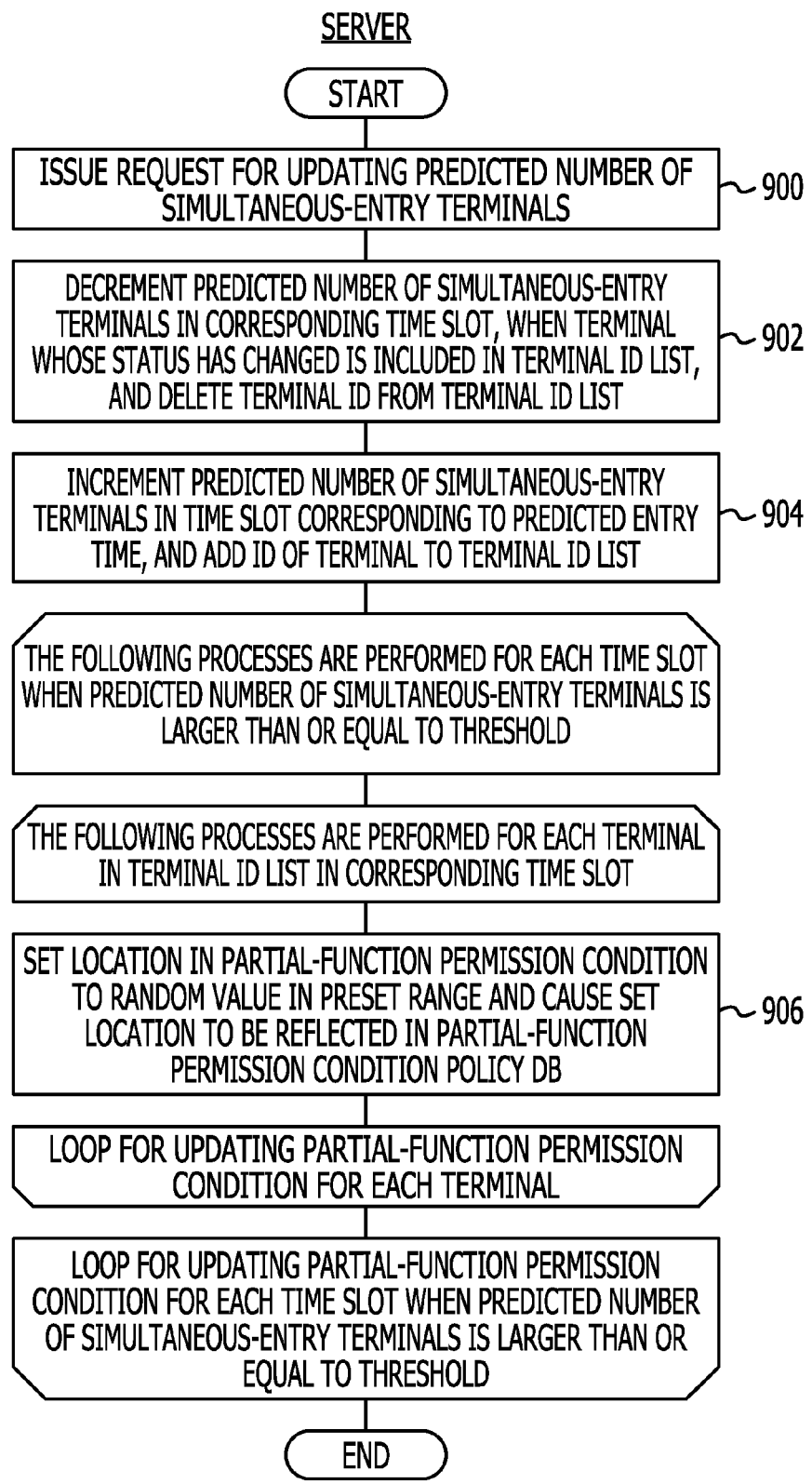

INFORMATION PROCESSING APPARATUS PERMITTING EXECUTION OF AN APPLICATION PROGRAM BY A TERMINAL APPARATUS BASED ON A LOCATION OF THE TERMINAL APPARATUS, AND INFORMATION PROCESSING METHOD OF PERMITTING THE APPLICATION PROGRAM TO BE EXECUTED BY THE TERMINAL APPARATUS BASED ON A LOCATION OF THE TERMINAL APPARATUS

CROSS-REFERENCE TO RELATED APPLICATIONS

This application is based upon and claims the benefit of priority of the prior Japanese Patent Application No. 2013-112099 filed on May 28, 2013, the entire contents of which are incorporated herein by reference.

FIELD

The embodiments discussed herein are related to an information processing apparatus, an information processing method, a non-transitory computer-readable storage medium, and a terminal apparatus.

BACKGROUND

A human centric computing (HCC) system has been advocated in which applications corresponding to the statuses of users, for example, the locations of users, are "pushed" for execution at appropriate timing to mobile communication terminal apparatuses, such as smartphones.

With such an HCC system, for example, when the user enters a meeting room, data and an application having a function used in a meeting are pushed to his or her communication terminal apparatus, or when the user enters a classroom, data and an application used in the class are pushed. When the user leaves the meeting room or the classroom, the corresponding application is deleted from the communication terminal apparatus.

In such a manner, when the status of the user enters a status in which he or she uses an application, the application is delivered to the communication terminal apparatus, and when the status of the user enters a status in which he or she does not use the application, the application is deleted. Thus, it is possible to reduce the user's burden of selecting and downloading the application according to his or her status.

For example, when the user exits a company building, deleting in-house applications and in-house data that are allowed to be used only in the company makes it possible to significantly reduce the possibility that internal-use-only information is leaked to outside parties. Examples of related art include Japanese Laid-open Patent Publication No. 2011-258086 and Japanese Laid-open Patent Publication No. 2003-303151.

In the HCC system in the related art, however, applications are pushed and deleted, upon detection of a change in the status. Thus, for example, since the application in use is suddenly quit and deleted when the user leaves a meeting room or the like, work is interrupted. In addition, when materials for a meeting are delivered upon entry to the meeting room, there are cases in which it is difficult for the user to have sufficient time to examine the materials before the meeting even if he or she wishes to. That is, there is a problem in that it is difficult to appropriately execute functions of an application in accordance with the status of a communication terminal apparatus.

SUMMARY

According to an aspect of the invention, an information processing apparatus includes a memory, and a processor coupled to the memory and configured to transmit an application to a terminal apparatus in accordance with information regarding a status, the information including at least one of location information of the terminal apparatus and time information, to permit the terminal apparatus to execute a first function and a second function of the application, when the status identified by the information matches a first condition that specifies at least one of a first location range and a first time range, and, to permit the terminal apparatus to execute the first function and prohibit the terminal apparatus to execute the second function, when the status identified by the information does not match the first condition and matches a second condition that specifies at least one of a second time range and a second location range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an example of a delivery-application registration DB;

FIG. 4 is a table illustrating an example of a delivery-policy management DB;

FIG. 5 is a table illustrating an example of a permission-condition DB;

FIG. 6 is a table illustrating an example of a partial-function-permission-policy DB;

FIG. 7 is a table illustrating an example of a number-of-API-calls DB;

FIG. 8 is a table illustrating an example of a user-status DB;

FIG. 21 is a table illustrating an example of an exclusive switching condition DB;

FIG. 22 is a table illustrating an example of a delivery-application registration DB;

FIG. 26 is a table illustrating an example of a user-status history DB;

FIG. 28 is a table illustrating an example of an application-transfer-time DB;

FIG. 29 is a table illustrating an example of an application-transfer-time DB;

FIG. 33 is a table illustrating an example of a predicted-number-of-simultaneous-entry-terminals DB;

FIG. 35 is a flowchart of a delivery-concentration avoidance processing.

DESCRIPTION OF EMBODIMENTS

One aspect of the disclosed technology provides an advantage in that it is possible to enable execution of one or some of functions of an application even under a situation in which a communication terminal apparatus is not originally permitted to execute the application.

Embodiments of the disclosed technology will be described below in detail by way of example with reference to the accompanying drawings.

First Embodiment

Figure 1:
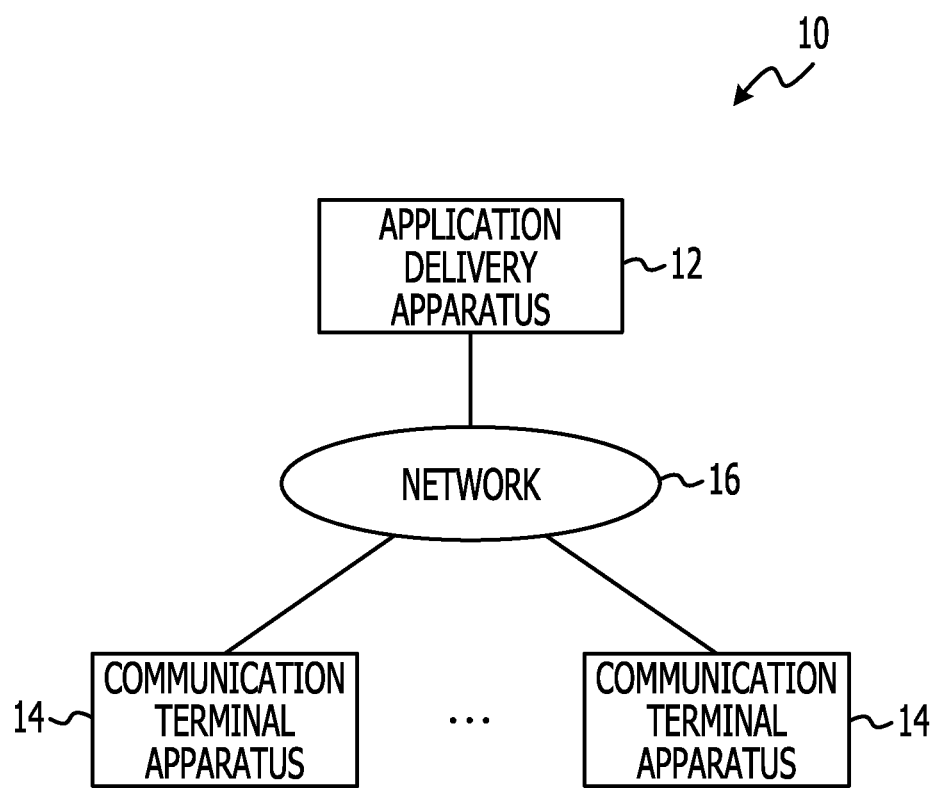
FIG. 1 is a block diagram of an application delivery system.

FIG. 1 illustrates an application delivery system 10 according to a first embodiment. The application delivery system 10 includes an application delivery apparatus 12 and a plurality of communication terminal apparatuses 14. The application delivery apparatus 12 and the communication terminal apparatuses 14 are connected through a network 16. The network 16 is, for example, the Internet or a local area network (LAN). The network 16 may also be a wireless communication link or a wired communication link. Hereinafter, the application delivery apparatus 12 may also be referred to as a "server", and each communication terminal apparatus 14 may also be referred to as a "terminal".

Each communication terminal apparatus 14 is, for example, one of mobile communication terminal apparatuses, such as a smartphone, a tablet terminal, and a mobile phone. Each communication terminal apparatus 14 may also be any apparatus that is capable of communicating with the application delivery apparatus 12. Examples include a notebook personal computer, game equipment, and a music player device. Each communication terminal apparatus 14 is an example of an application execution apparatus in the disclosed technology.

The application delivery apparatus 12 delivers an application to each communication terminal apparatus 14 in accordance with the status of the communication terminal apparatus 14 or requests each communication terminal apparatus 14 to delete an already delivered application. The term "status" as used herein includes at least one of the location of the communication terminal apparatus 14 and a time.

The application delivery system 10 is an HCC system in which, according to the status of the communication terminal apparatus 14, an application is "pushed" to the communication terminal apparatus 14 for execution at an appropriate timing. Unlike in the HCC system in the related art, in the application delivery system 10, an application is not pushed and deleted upon detection of a change in the status of a terminal. Instead, one or some of functions of an application to be executed are enabled even when execution of the application is not originally permitted.

Examples of the application include small-scale applications (micro applications) for approval of each predetermined project, questionnaires, and accounting for business trips, as well as software, such as mail software, word-processing software, and spreadsheet software. The application is created according to, for example, specifications of Hyper Text Markup Language (HTML) 5, Cascading Style Sheets (CSS), JavaScript (registered trademark), or the like, but the present technology is not limited thereto.

In accordance with the status of the communication terminal apparatus 14, the application delivery apparatus 12 delivers, to the communication terminal apparatus 14, an all-function permission policy that permits all functions of the application or a partial-function permission policy that permits one or some of the functions of the application. The application delivery apparatus 12 may also deliver a function permission policy that permits a predetermined single function or some predetermined functions of all of the functions, instead of the all-function permission policy that permits all of the functions. In this case, the partial-function permission policy is a policy that permits one or some of the predetermined function(s).

When a change occurs in the status including at least one of the location of the communication terminal apparatus 14 and the time, the communication terminal apparatus 14 transmits status-change information to the application delivery apparatus 12.

Although details are described below, the status-change information is, for example, a terminal identifier (ID) for identifying the terminal, information indicating that an application executed by the terminal is quit, information indicating that an application is launched, or user-status information indicating that the status including at least one of the location of the terminal and the time has changed from the current status.

Also, when an application is delivered from the application delivery apparatus 12, the communication terminal apparatus 14 executes a function or functions of the application in accordance with the policy delivered from the application delivery apparatus 12.

Figure 2:
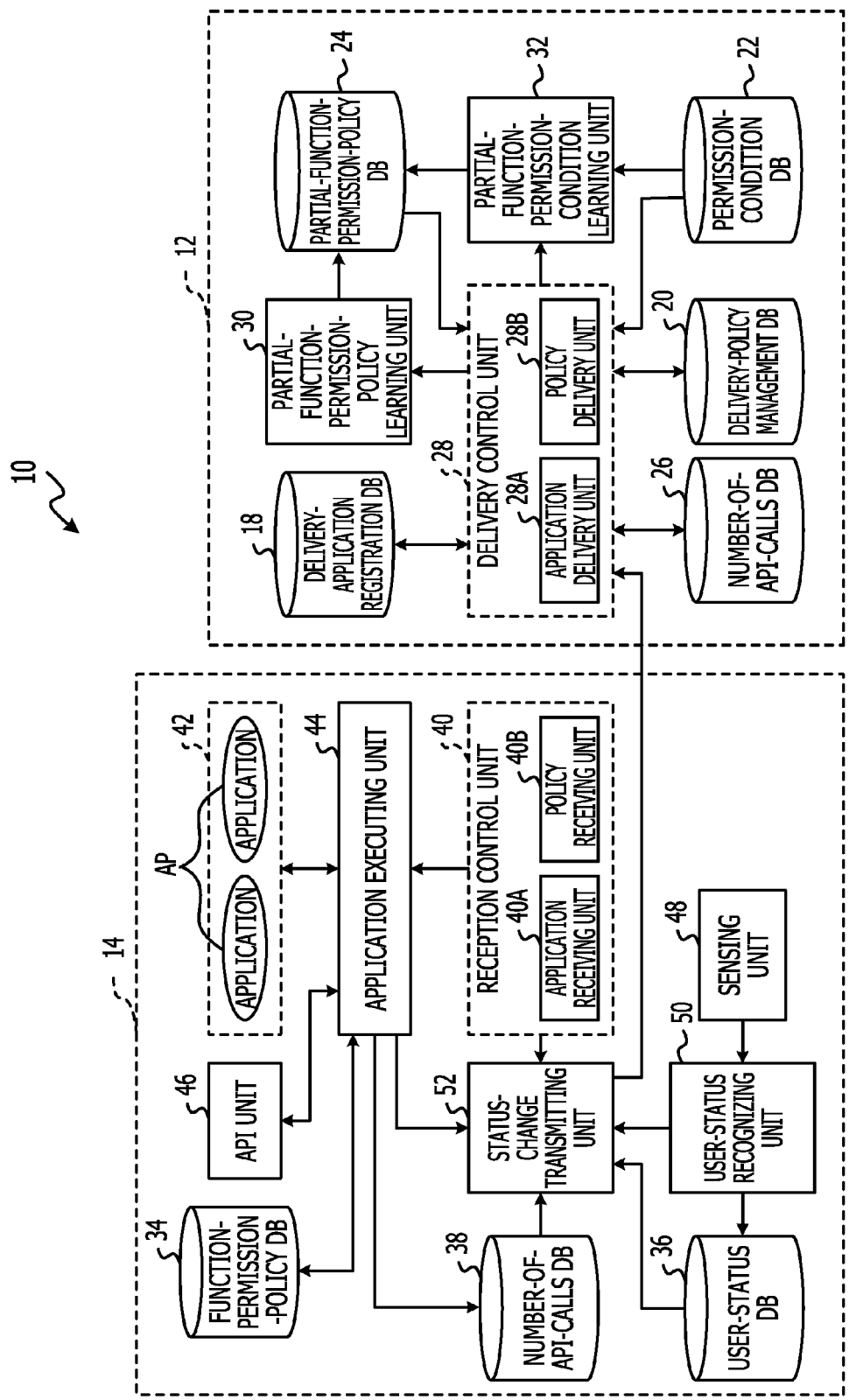
FIG. 2 is a block diagram of an application delivery apparatus and a communication terminal apparatus according to a first embodiment.

As illustrated in FIG. 2, the application delivery apparatus 12 includes a delivery-application registration database (DB) 18, a delivery-policy management DB 20, a permission-condition DB 22, a partial-function-permission-policy DB 24, and a number-of-API-calls DB 26. The application delivery apparatus 12 further includes a delivery control unit 28, a partial-function-permission-policy learning unit 30, and a partial-function-permission-condition learning unit 32. The delivery control unit 28 includes an application delivery unit 28A and a policy delivery unit 28B.

As illustrated in FIG. 3, the delivery-application registration DB 18 is a database in which delivery-application registration information, including user IDs, terminal IDs, application names, delivery states, and application data, is registered.

As illustrated in FIG. 4, the delivery-policy management DB 20 is a database in which delivery-policy information, including user IDs, terminal IDs, application names, and delivered policies, is registered.

As illustrated in FIG. 5, the permission-condition DB 22 is a database in which sets of permission-condition information, each including an application name, an enable-use condition, and an all-function permission condition, are registered. The enable-use condition is a condition specifying that, when it is satisfied, a corresponding application is usable, and when it is not satisfied, a corresponding application is to be deleted. The all-function permission condition is a condition specifying that, when it is satisfied, all functions of a corresponding application are executable. A function permission condition that enables execution of a predetermined single function or some predetermined functions of all of the functions may also be used instead of the all-function permission condition.

For example, the enable-use condition in the permission-condition information denoted by No. 1 in FIG. 5 specifies that, when the condition that the location of the communication terminal apparatus 14 is inside a company (that is, "location is inside company") is satisfied, a meeting application A is usable. The all-function permission condition in the permission-condition information denoted by No. 1 specifies that, when the condition "location is inside meeting room, and time is within meeting time" is satisfied, all of the functions of the "meeting application A" are executable. Although not illustrated in FIG. 5, the condition "location is inside company" is also defined, for example, based on location-specifying information, such as longitude and latitude, with respect to the range covered by "inside company". Similarly, a specific meeting time is also specified with respect to the "within meeting time". That is, when the condition is a condition regarding the location, information for identifying the location is also defined, and when the condition is a condition regarding the time, information for specifying a point in time (or a period of time) is also defined.

As illustrated in FIG. 6, the partial-function-permission-policy DB 24 is a database in which partial-function permission policies, each including an application name, a user ID, a terminal ID, a partial-function permission condition, and information indicating whether or not each function of an application is executable, are registered.

When the partial-function permission condition stated in the "partial-function permission condition" field is satisfied, the "function" fields indicate that execution of the function(s) denoted by "○" is permitted. The partial-function permission policy denoted by No. 1 illustrated in FIG. 6 indicates that a function 1 is executable when the application is the "meeting application A", the user is "User001", the terminal ID is "T081", and the partial-function permission condition "within 30 minutes before start and after end of meeting" is satisfied. The function 1 in this case is "file read". Since a function 2 (file write), a function 3 (camera function), and a function 4 (sound-recording function) are denoted by "x", the execution thereof is not permitted, that is, is prohibited. Also, "within 30 minutes before start and after end of meeting" indicates a period from 30 minutes before the start of a meeting until the start of the meeting and a period from the end of the meeting until 30 minutes after the end of the meeting. Thus, the partial-function permission policy denoted by No. 1 in FIG. 6 indicates that only the function "file read" of the "meeting application A" is executable in the period from 30 minutes before the start of a meeting until the start of the meeting and the period from the end of the meeting until 30 minutes after the end of the meeting. When the function permission condition that enables execution of a predetermined single function or some predetermined functions of all of the functions is used instead of the all-function permission condition, the partial-function permission condition indicates a condition that permits one or some of the predetermined function(s).

As illustrated in FIG. 7, the number-of-API-calls DB 26 is a database in which sets of number-of-API-calls information, each including an application name, an application programming Interface (API), permission information, and the numbers of calls, are registered. The number-of-API-calls information registered in the number-of-API-calls DB 26 is number-of-API-calls information (described below) transmitted from the communication terminal apparatus 14.

The application delivery unit 28A in the delivery control unit 28 delivers a corresponding application to the communication terminal apparatus 14 for which the enable-use condition and the all-function permission condition in the permission-condition DB 22 are satisfied. In this case, the policy delivery unit 28B in the delivery control unit 28 delivers, to the communication terminal apparatus 14 to which the application was delivered, the all-function permission policy indicating that all functions of the application are executable.

When the partial-function permission condition is satisfied in a case in which the enable-use condition is satisfied and the all-function permission condition is not satisfied, the application delivery unit 28A delivers a corresponding application to the communication terminal apparatus 14 for which the partial-function permission condition is satisfied. In this case, the policy delivery unit 28B delivers the partial-function permission policy indicating that one or some of the functions of the application are executable to the communication terminal apparatus 14 to which the application was delivered.

The application delivery unit 28A also delivers an application delete request for issuing a request for deleting the application to the communication terminal apparatus 14 for which the enable-use condition is not satisfied.

Based on the number of calls of each API in the number-of-API-calls DB 26, the partial-function-permission-policy learning unit 30 switches between the permission and the non-permission of the corresponding API to update the number-of-API-calls DB 26.

Based on the timings of the launching and quitting of an application, the partial-function-permission-condition learning unit 32 learns the partial-function permission condition in the partial-function-permission-policy DB 24 to update the partial-function-permission-policy DB 24.

As illustrated in FIG. 2, each communication terminal apparatus 14 includes a function-permission-policy DB 34, a user-status DB 36, and a number-of-API-calls DB 38. The communication terminal apparatus 14 further includes a reception control unit 40, an application storage unit 42, an application executing unit 44, an API unit 46, a sensing unit 48, a user-status recognizing unit 50, and a status-change transmitting unit 52. The reception control unit 40 includes an application receiving unit 40A and a policy receiving unit 40B.

The function-permission-policy DB 34 is a database in which the all-function permission policy and the partial-function permission policy delivered from the policy delivery unit 28B in the application delivery apparatus 12 are stored. The function-permission-policy DB 34 has substantially the same format as the partial-function-permission-policy DB 24 illustrated in FIG. 6.

As illustrated in FIG. 8, the user-status DB 36 is a database in which user-status information, including user-status types and current statuses, is registered.

The number-of-API-calls DB 38 is also substantially the same as the number-of-API-calls DB 26 illustrated in FIG. 7.

The application receiving unit 40A in the reception control unit 40 receives an application delivered from the application delivery unit 28A in the application delivery apparatus 12 and stores the received application in the application storage unit 42.

The policy receiving unit 40B in the reception control unit 40 stores the all-function permission policy or the partial-function permission policy, delivered from the policy delivery unit 28B in the application delivery apparatus 12, in the function-permission-policy DB 34.

The application executing unit 44 executes an application AP stored in the application storage unit 42. The application executing unit 44 executes the application by calling, from the API unit 46, an API corresponding to a function for which an instruction for execution is given by the user.

The API unit 46 stores therein APIs corresponding to various functions. By executing the API called by the application executing unit 44, the API unit 46 executes a function of the application.

The sensing unit 48 obtains, for example, location information (indicating the current location) of the communication terminal apparatus 14 and information, such as the orientation, the direction of movement, the speed of movement, and so on thereof. In this case, the sensing unit 48 has, for example, a GPS function for obtaining the location information. By performing position determination using the GPS function, the sensing unit 48 obtains, for example, location information including the longitude and latitude or location information in which they are replaced with a predetermined coordinate system. The sensing unit 48 may also have a short-range communication function employing WiFi (registered trademark), Bluetooth (registered trademark), or the like. In such a case, the sensing unit 48 may obtain, as the location information of the communication terminal apparatus 14, the location information of another terminal (such as a relay device or a wireless base station) with which the communication terminal apparatus 14 is capable of communicating through short-range communication.

The sensing unit 48 also has, for example, an acceleration sensor and an angle sensor to obtain information, such as the orientation, the direction of movement, and the speed of movement of the communication terminal apparatus 14.

Based on the location information obtained by the sensing unit 48, the time, and so on, the user-status recognizing unit 50 recognizes the status of the communication terminal apparatus 14, that is, the user status. When the current status in the user-status DB 36 changes, the user-status recognizing unit 50 updates the user-status DB 36.

When the status of the communication terminal apparatus 14 changes, the status-change transmitting unit 52 sends, to the application delivery apparatus 12, status-change information indicating that the status has changed.

Figure 9:
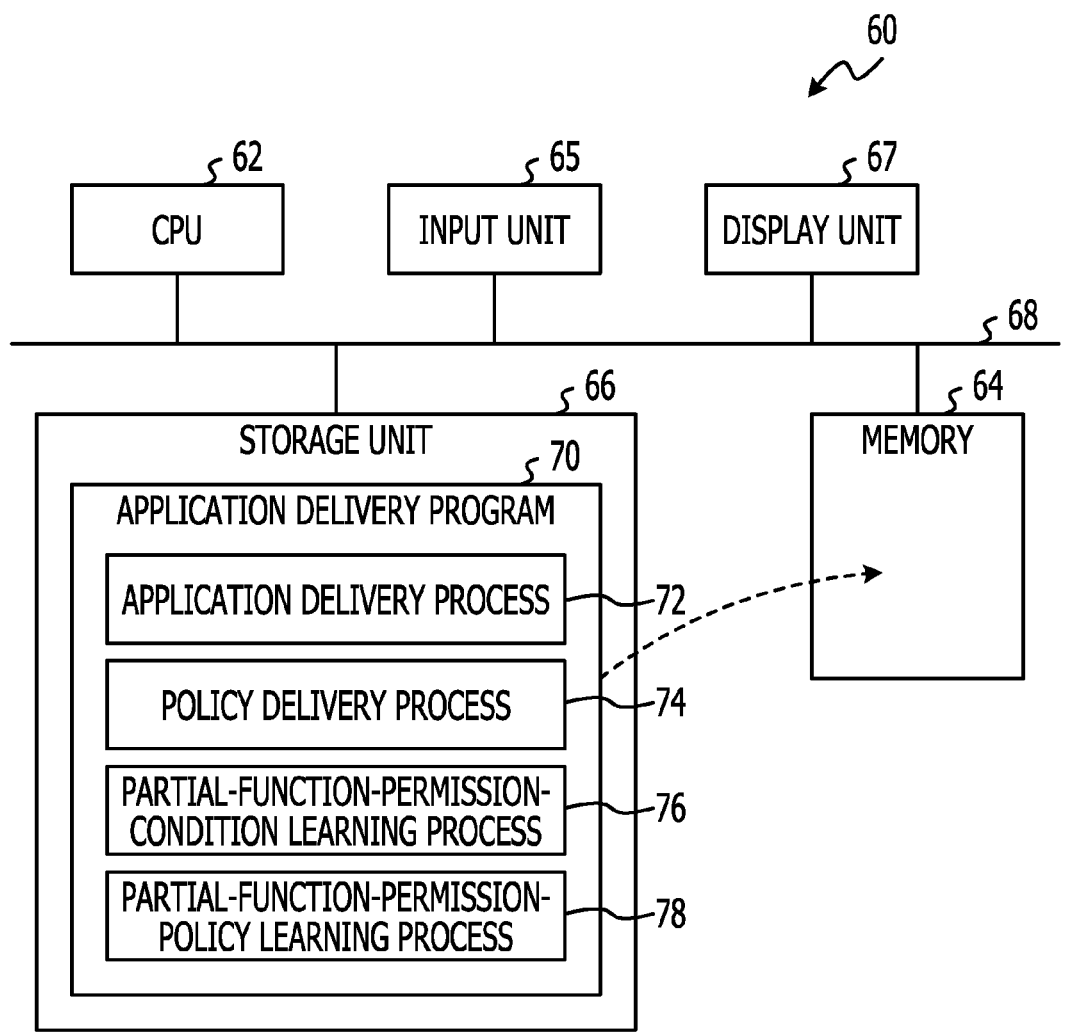
FIG. 9 is a block diagram of a computer that serves as the application delivery apparatus.

The application delivery apparatus 12 may be implemented by, for example, an apparatus including a computer 60 illustrated in FIG. 9. The computer 60 includes a central processing unit (CPU) 62, a memory 64, an input unit 65, a nonvolatile storage unit 66, and a display unit 67, which are interconnected through a bus 68.

The storage unit 66 may also be implemented by a recording medium, such as a hard disk drive (HDD), a flash memory, or the like. The storage unit 66 stores therein an application delivery program 70 for causing the computer 60 to function as the application delivery apparatus 12. The CPU 62 reads the application delivery program 70 from the storage unit 66, loads the application delivery program 70 into the memory 64, and sequentially executes processes included in the application delivery program 70.

The application delivery program 70 includes an application delivery process 72, a policy delivery process 74, a partial-function-permission-condition learning process 76, and a partial-function-permission-policy learning process 78.

The CPU 62 executes the application delivery process 72 to thereby operate as the application delivery unit 28A illustrated in FIG. 2. The CPU 62 also executes the policy delivery process 74 to thereby operate as the policy delivery unit 28B illustrated in FIG. 2. The CPU 62 also executes the partial-function-permission-condition learning process 76 to thereby operate as the partial-function-permission-condition learning unit 32 illustrated in FIG. 2. The CPU 62 also executes the partial-function-permission-policy learning process 78 to thereby operate as the partial-function-permission-policy learning unit 30 illustrated in FIG. 2.

Thus, the computer 60 that executes the application delivery program 70 functions as the application delivery apparatus 12. The application delivery program 70 is an example of an application delivery program in the disclosed technology.

The application delivery apparatus 12 may also be implemented by, for example, a semiconductor integrated circuit, specifically, an application-specific integrated circuit (ASIC) or the like.

Figure 10:
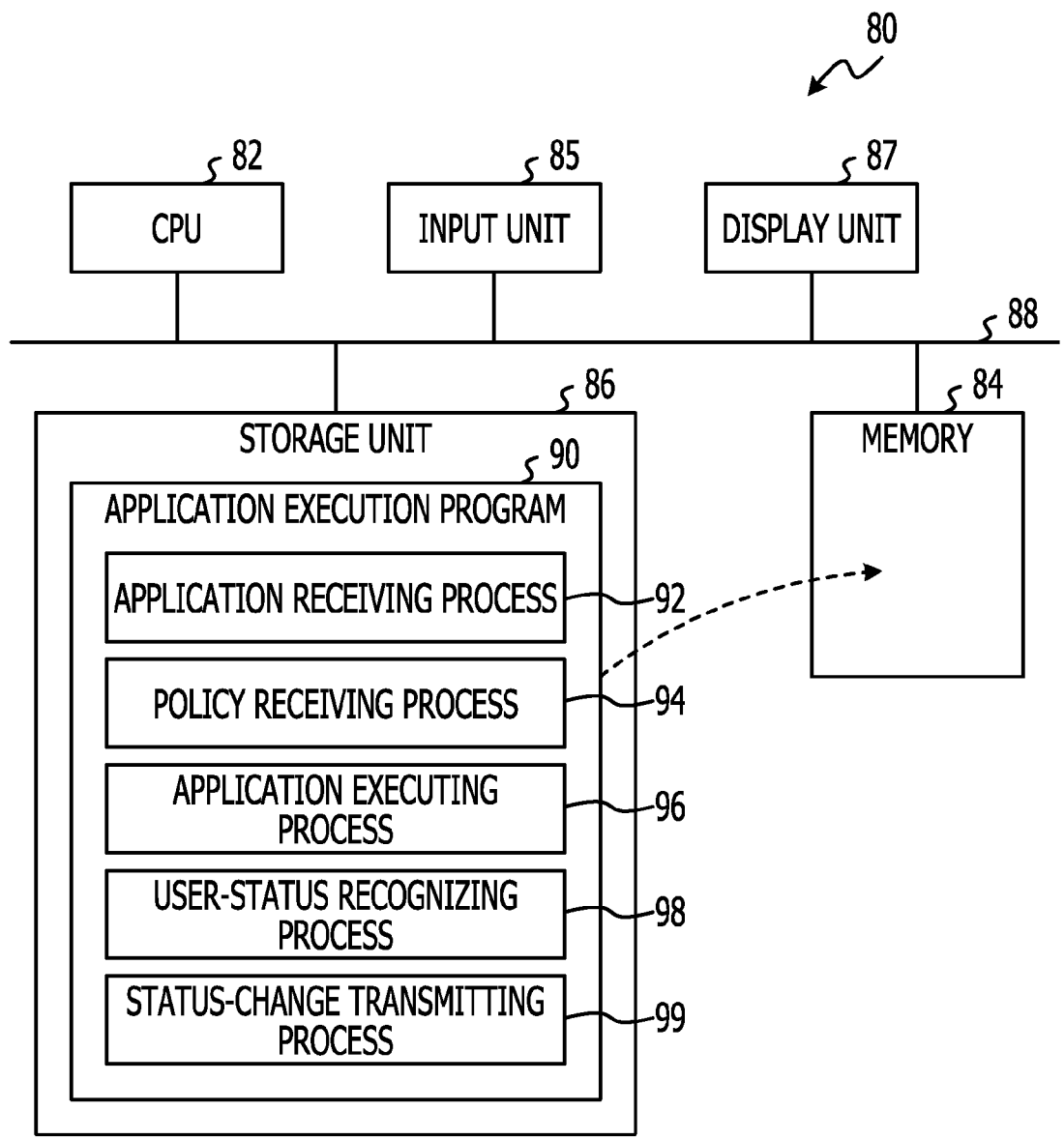
FIG. 10 is a block diagram of a computer that serves as the communication terminal apparatus.

Each communication terminal apparatus 14 may be implemented by, for example, an apparatus including a computer 80 illustrated in FIG. 10. The computer 80 includes a CPU 82, a memory 84, an input unit 85, a nonvolatile storage unit 86, and a display unit 87, which are interconnected through a bus 88.

The storage unit 86 may be implemented by a recording medium, such as a HDD, a flash memory, or the like. The storage unit 86 stores therein an application execution program 90 for causing the computer 80 to function as the communication terminal apparatus 14 serving as an application execution apparatus. The CPU 82 reads the application execution program 90 from the storage unit 86, loads the application execution program 90 into the memory 84, and sequentially executes processes included in the application execution program 90.

The application execution program 90 includes an application receiving process 92, a policy receiving process 94, an application executing process 96, a user-status recognizing process 98, and a status-change transmitting process 99.

The CPU 82 executes the application receiving process 92 to thereby operate as the application receiving unit 40A illustrated in FIG. 2. The CPU 82 also executes the policy receiving process 94 to thereby operate as the policy receiving unit 40B illustrated in FIG. 2. The CPU 82 also executes the application executing process 96 to thereby operate the application executing unit 44 illustrated in FIG. 2. The CPU 82 also executes the user-status recognizing process 98 to operate as the user-status recognizing unit 50 illustrated in FIG. 2. The CPU 82 also executes the status-change transmitting process 99 to thereby operate as the status-change transmitting unit 52 illustrated in FIG. 2.

Thus, the computer 80 that executes the application execution program 90 functions as the communication terminal apparatus 14. The application execution program 90 is an example of the application execution program in the disclosed technology.

The communication terminal apparatus 14 may also be implemented by a semiconductor integrated circuit, specifically, an ASIC or the like.

Figure 11:
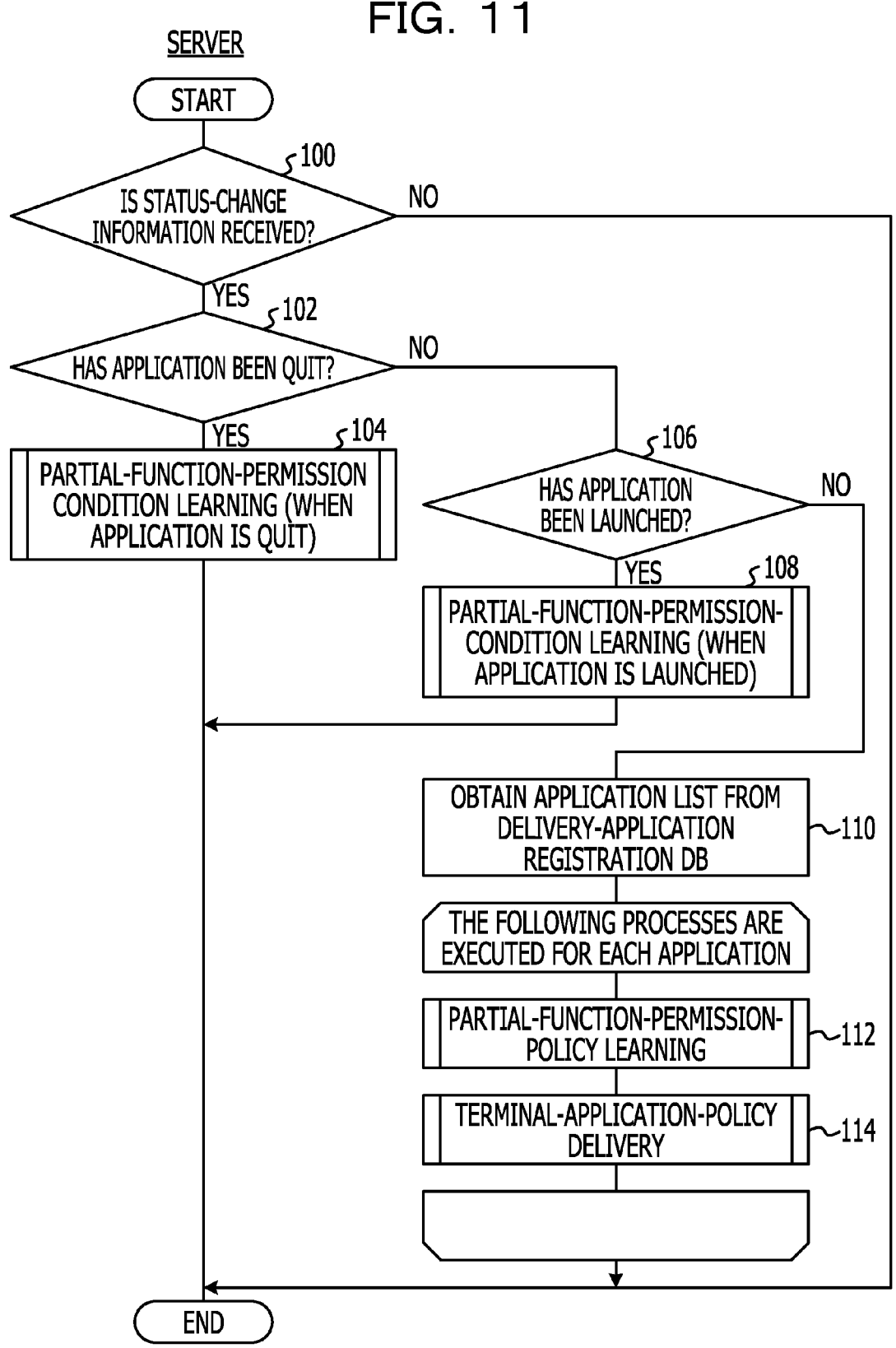
FIG. 11 is a flowchart of application delivery processing.

Next, a description will be given of an operation of the first embodiment. First, processing executed by the application delivery apparatus 12 will be described with reference to the flowchart illustrated in FIG. 11. The processing illustrated in FIG. 11 is periodically executed.

In step 100, the application delivery unit 28A determines whether or not the status-change information is received from any of the communication terminal apparatuses 14. When the status-change information is received, the process proceeds to step 102. When no status-change information is received, this routine ends. In this case, when the status-change information is received from two or more of the communication terminal apparatuses 14, the processes from step 102 to step 114 are executed for each communication terminal apparatus 14 from which the status-change information was received.

In step 102, the application delivery unit 28A determines whether or not the status-change information received from the communication terminal apparatus 14 in step 100 is information indicating that an application has been quit. When the status-change information is information indicating that an application has been quit, the process proceeds to step 104. When the status-change information is not information indicating that an application has been quit, the process proceeds to step 106.

Figure 12:
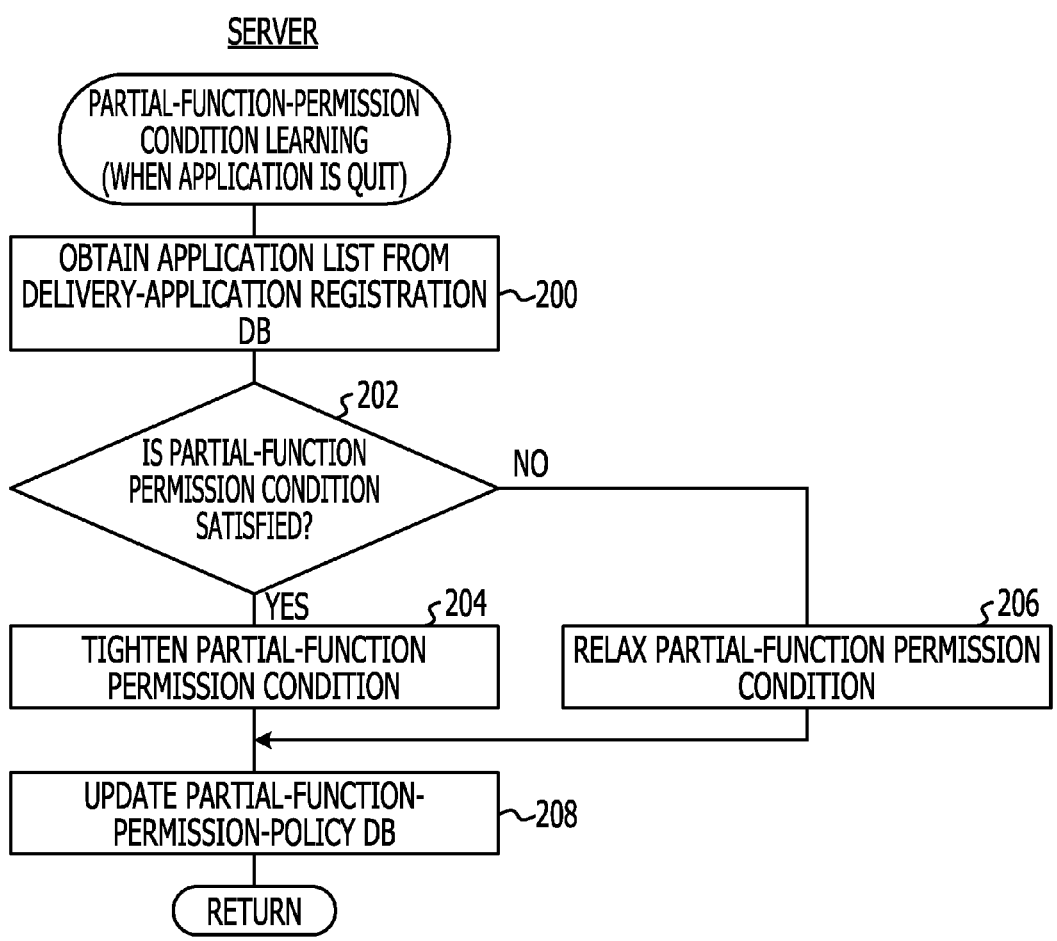
FIG. 12 is a flowchart of partial-function-permission-condition learning processing (when an application is quit)

In step 104, the partial-function-permission-condition learning unit 32 executes partial-function-permission-condition learning processing illustrated in FIG. 12.

In step 200 illustrated in FIG. 12, the partial-function-permission-condition learning unit 32 obtains, from the partial-function-permission-policy DB 24, the partial-function permission policy corresponding to the terminal ID included in the status-change information received in step 100 in FIG. 11.

In step 202, the partial-function-permission-condition learning unit 32 determines whether or not the partial-function permission condition in the obtained partial-function permission policy is satisfied. When the partial-function permission condition is satisfied, the process proceeds to step 204. When the partial-function permission condition is not satisfied, the process proceeds to step 206.

In step 204, the partial-function-permission-condition learning unit 32 tightens the partial-function permission condition more than the current setting. More specifically, when the partial-function permission condition is a condition regarding a point in time (or a period of time), the period is reduced by a certain period of time, and when the partial-function permission condition is a condition regarding a location (or a range), the range is reduced by a certain amount. For instance, in the example of policy No. 1 illustrated in FIG. 6, "within 30 minutes before start and after end of meeting" is changed to "within 25 minutes before start and after end of meeting". In the example of policy No. 7 illustrated in FIG. 6, "within 3 m from perimeter of meeting room" is changed to "within 2.5 m from perimeter of meeting room".

On the other hand, in step 206, the partial-function-permission-condition learning unit 32 relaxes the partial-function permission condition more than the current condition. More specifically, when the partial-function permission condition is a condition regarding the period, the period is increased by a certain period of time, and when the partial-function permission condition is a condition regarding the location, that is, a condition regarding a range, the range is increased by a certain amount. For instance, in the example of policy No. 1 illustrated in FIG. 6, "within 30 minutes before start and after end of meeting" is changed to "within 35 minutes before start and after end of meeting". In the example of policy No. 7 illustrated in FIG. 6, "within 3 m from perimeter of meeting room" is changed to "within 3.5 m from perimeter of meeting room".

In step 208, the partial-function-permission-policy DB 24 is updated with the partial-function permission condition re-set in step 204 or 206.

In step 106 illustrated in FIG. 11, the application delivery unit 28A determines whether or not the status-change information received in step 100 is information indicating that an application has been launched. When the status-change information received in step 100 is information indicating that an application has been launched, the process proceeds to step 108. When the status-change information received in step 100 is not information indicating that an application has been launched, the process proceeds to step 110.

Figure 13:
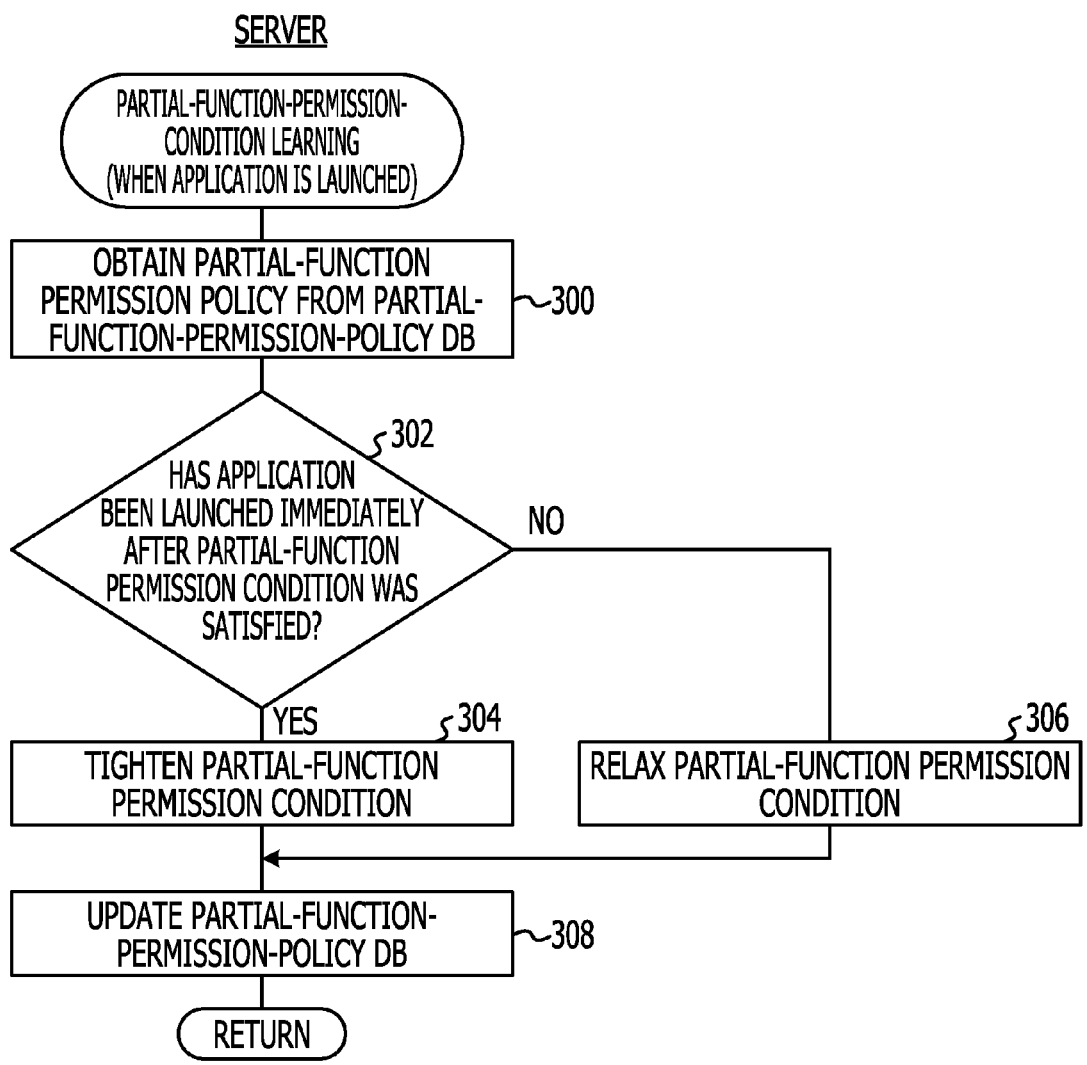
FIG. 13 is a flowchart of partial-function-permission-condition learning processing (when an application is launched)

In step 108, the partial-function-permission-condition learning unit 32 executes partial-function-permission-condition learning processing illustrated in FIG. 13.

In step 300 illustrated in FIG. 13, the partial-function-permission-condition learning unit 32 obtains, from the partial-function-permission-policy DB 24, the partial-function permission policy corresponding to the terminal ID included in the status-change information received in step 100 in FIG. 11.

In step 302, the partial-function-permission-condition learning unit 32 determines whether or not the user has launched the application early, that is, immediately after the partial-function permission condition defined in the obtained partial-function permission policy was satisfied. When the user has launched the application immediately after the partial-function permission condition was satisfied, the process proceeds to step 304. When the user has launched the application not immediately after the partial-function permission condition was satisfied, the process proceeds to step 306.

In step 304, the partial-function-permission-condition learning unit 32 relaxes the partial-function permission condition more than the current setting, as in step 206 in FIG. 12.

On the other hand, in step 306, the partial-function-permission-condition learning unit 32 tightens the partial-function permission condition more than the current setting, as in step 204 in FIG. 12.

In step 308, the partial-function-permission-policy DB 24 is updated with the partial-function permission condition re-set in step 304 or 306, as in step 208 in FIG. 12.

As described above, when an application is quit in a state in which the partial-function permission condition is satisfied, the partial-function permission condition is tightened, and when an application is quit in a state in which the partial-function permission condition is not satisfied, the partial-function permission condition is relaxed. In addition, when an application is launched immediately after the partial-function permission condition is satisfied, the partial-function permission condition is relaxed, and when an application is launched not immediately after the partial-function permission condition is satisfied, the partial-function permission condition is tightened. With this arrangement, the partial-function-permission-condition learning unit 32 learns an optimum condition for the partial-function permission condition, in accordance with the user's application use status.

In step 110 in FIG. 11, the application delivery unit 28A obtains, from the delivery-application registration DB 18, an application list corresponding to the terminal ID included in the status-change information received in step 100.

Processes in steps 112 and 114 are then executed for each of the applications included in the obtained application list.

Figure 14:
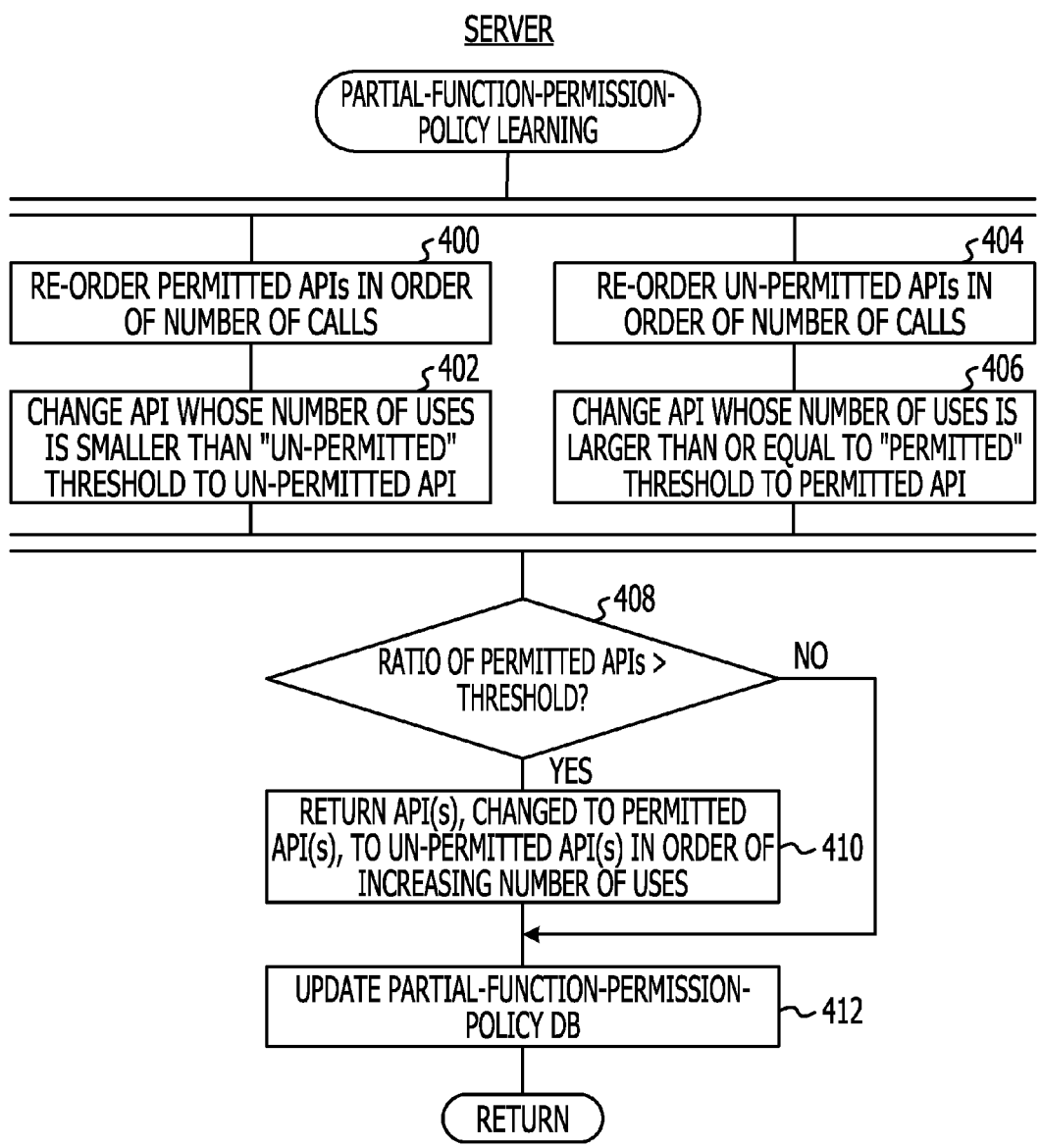
FIG. 14 is a flowchart of partial-function-permission-policy learning processing.

In step 112, the partial-function-permission-policy learning unit 30 executes partial-function-permission-policy learning processing illustrated in FIG. 14.

In step 400 in FIG. 14, the partial-function-permission-policy learning unit 30 reads, from the number-of-API-calls DB 26, the number of calls for each of permitted APIs for which the permission information indicates "permitted" and re-orders the permitted APIs in order of the number of calls.

In step 402, the partial-function-permission-policy learning unit 30 changes, among the permitted APIs read in step 400, the permitted API whose number of calls is smaller than a predetermined "un-permitted" threshold to an un-permitted API. In this case, for example, when the number of calls of the permitted API is smaller than the value of the "un-permitted" threshold, the number of calls is small and thus the frequency of use by the user is low, and hence, the "un-permitted" threshold is set to a value for which it can be determined that changing the permitted API to the un-permitted API does not affect user convenience.

In step 404, the partial-function-permission-policy learning unit 30 reads, from the number-of-API-calls DB 26, the number of calls for each un-permitted API whose permission information indicates "un-permitted", and re-orders the un-permitted APIs in order of the number of calls.

In step 406, the partial-function-permission-policy learning unit 30 changes, among the un-permitted APIs read in step 404, the un-permitted API whose number of calls is larger than or equal to a predetermined "permitted" threshold to a permitted API. In this case, for example, when the number of calls of the un-permitted API is larger than or equal to the value of the "permitted" threshold, the number of calls is large and thus the frequency of use by the user is low, and hence, the "permitted" threshold is set to a value for which it can be determined that changing the un-permitted API to the permitted API enhances user convenience.

Although a case in which steps 400 and 402 and steps 404 and 406 are processed in parallel has been described with reference to FIG. 14, the present technology is not limited thereto. For example, steps 400 to 406 may also be processed sequentially.

In step 408, the partial-function-permission-policy learning unit 30 determines whether or not the ratio of the permitted APIs exceeds a predetermined threshold. When the ratio exceeds the predetermined threshold, the process proceeds to step 410. When the ratio does not exceed the predetermined threshold, the process proceeds to step 412.

The threshold is set, for example, by calculating the ratio of the location (range) or time set by the partial-function permission condition to that between the enable-use condition and the all-function permission condition. More specifically, for example, it is assumed that the enable-use condition for application X is "inside company (10000 m$^2$)", the partial-function permission condition is "inside building (8000 m$^2$)", and the all-function permission condition is "inside meeting room (25 m$^2$)".

Figure 15:
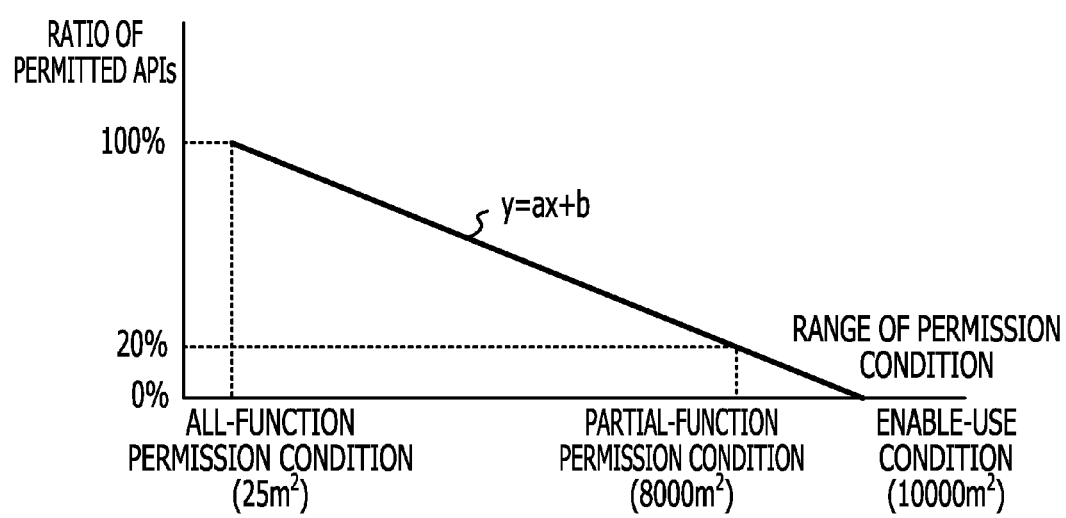
FIG. 15 illustrates a relationship between the range of a permission condition and the range of the ratio of permitted APIs.

In this case, as illustrated in FIG. 15, the horizontal axis indicates respective ranges set by the enable-use condition, the partial-function permission condition, and the all-function permission condition, and the vertical axis indicates the ratio of the permitted APIs. A linear expression y=ax+b indicating the relationship between the range set by each condition and the ratio of the permitted APIs is determined assuming that the ratio of the permitted APIs for the enable-use condition is 0% and the ratio of the permitted APIs for the all-function permission condition is 100%. In the case of the above-described example, a=−100/9975 and b=−1000a are given. Then, y obtained by assigning the partial-function permission condition to x is set as the threshold. In the above-described example, when 8000 (m$^2$) for the partial-function permission condition is assigned to x, y≈20(%) is given, and thus the threshold is set to 20%.

As illustrated in FIG. 15, as the range of the permission condition is reduced, the ratio of the permitted APIs increases, and as the range of the permission condition is increased, the ratio of the permitted APIs decreases. Accordingly, the user is motivated so as to move to a smaller range where the ratio of the permitted APIs increases, and this is also preferable in terms of security. When each condition is related to the time, the threshold may also be set in the same manner as described above.

In step 410, the partial-function-permission-policy learning unit 30 returns the API(s), changed from the un-permitted API(s) to the permitted API(s), to the un-permitted API(s) in order of increasing number of calls so that the ratio of the permitted APIs is smaller than or equal to the threshold.

In step 412, the partial-function-permission-policy DB 24 is updated according to the above-described processing result. That is, with respect to the API(s) changed from the un-permitted API(s) to the permitted API(s), the permission information is changed to "permitted", and with respect to the API(s) changed from the permitted API(s) to the un-permitted API(s), the permission information is changed to "un-permitted".

Figure 16:
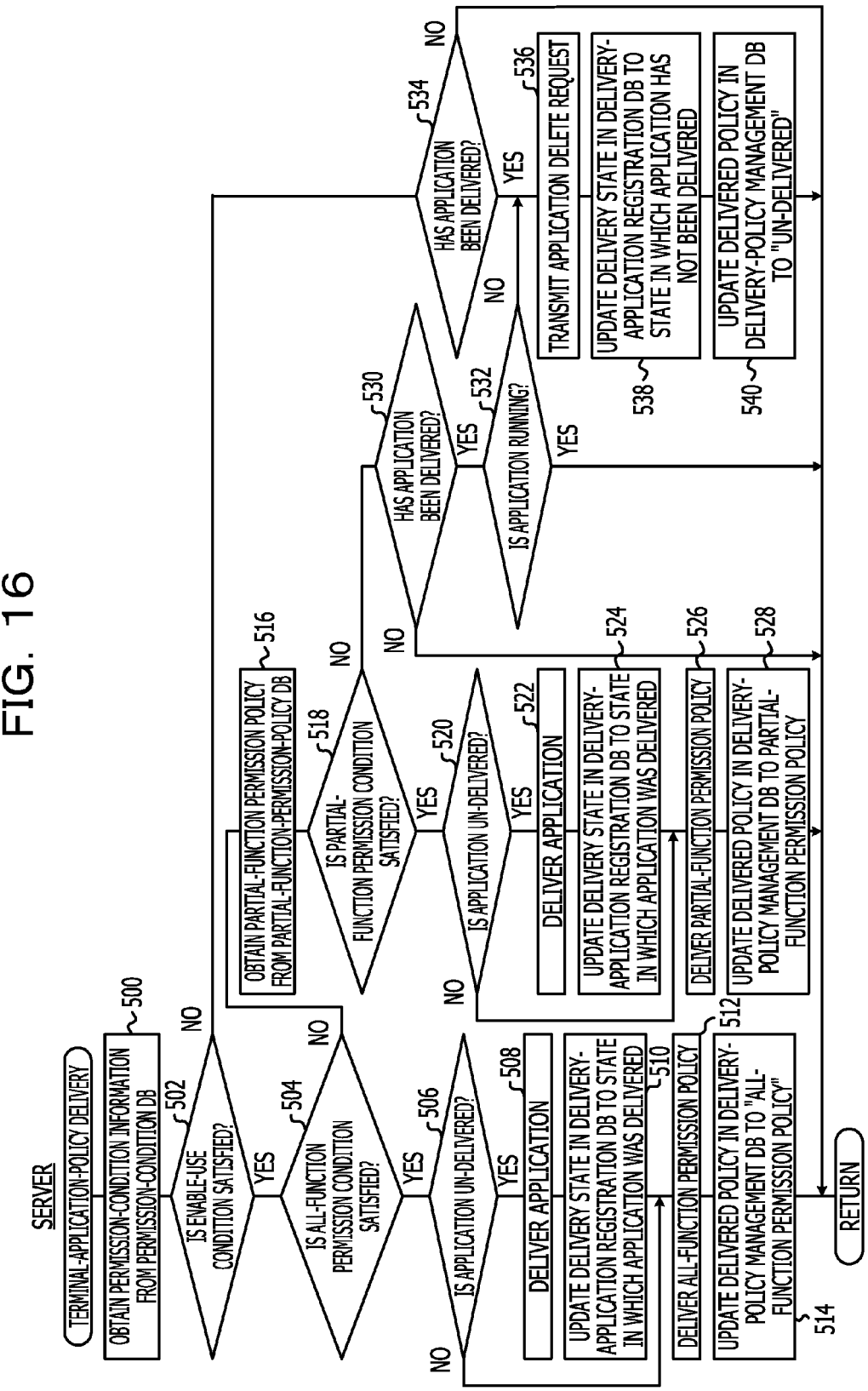
FIG. 16 is a flowchart of terminal-application-policy delivery processing.

In step 114 in FIG. 11, the delivery control unit 28 executes terminal-application-policy delivery processing, illustrated in FIG. 16, on each of the applications included in the application list obtained in step 110.

In step 500, the policy delivery unit 28B obtains the permission-condition information from the permission-condition DB 22.

In step 502, the policy delivery unit 28B determines whether or not the enable-use condition in the permission-condition information is satisfied with respect to the terminal corresponding to the terminal ID included in the status-change information received in step 100 in FIG. 11 and one of the applications in the application list obtained in step 110. When the enable-use condition is satisfied, the process proceeds to step 504. When the enable-use condition is not satisfied, the process proceeds to step 534.

Whether or not the enable-use condition is satisfied is determined based on the user-status information included in the status-change information received in step 100 in FIG. 11. For example, in the permission-condition information denoted by No. 1 in the permission-condition DB 22 illustrated in FIG. 5, the enable-use condition for the meeting application A is set as "location is inside company". In this case, when the user-status information transmitted from the terminal includes the user-status information denoted by No. 1 in the user-status DB 36 illustrated in FIG. 8, the current status for the user-status type "status inside/outside company" indicates "inside company", it may be determined that the enable-use condition is satisfied.

In step 504, the policy delivery unit 28B determines whether or not the all-function permission condition is satisfied with respect to the application for which the enable-use condition is satisfied. When the all-function permission condition is satisfied, the process proceeds to step 506. When the all-function permission condition is not satisfied, the process proceeds to step 516.

Whether or not the all-function permission condition is satisfied is determined based on the user-status information included in the status-change information received in step 100 in FIG. 11. For example, in the permission-condition information denoted by No. 1 in the permission-condition DB 22 in FIG. 5, the all-function permission condition for the meeting application A is set as "location is in meeting room, and time is within meeting time (16:00-17:00)". In this case, when the user-status information transmitted from the terminal includes the user-status information denoted by Nos. 2 and 3 in the user-status DB 36 in FIG. 8, the current status for the user-status type "status inside/outside meeting room" is "inside meeting room" and the current status for the user-status type "time slot" is "between 16:00 and 17:00". Thus, it may be determined that the all-function permission condition is satisfied.

In step 506, by referring to the delivery-application registration DB 18, the policy delivery unit 28B determines whether or not any application for which the enable-use condition and the all-function permission condition are satisfied is un-delivered. When any application for which the enable-use condition and the all-function permission condition are satisfied is un-delivered, the process proceeds to step 508. When the application has been delivered, the process proceeds to step 512.

In step 508, the application delivery unit 28A delivers, to the terminal, the application for which the enable-use condition and the all-function permission condition are satisfied.

In step 510, the application delivery unit 28A updates, in the delivery-application registration DB 18, the delivery state of the application for which the enable-use condition and the all-function permission condition are satisfied to "delivered".

In step 512, the policy delivery unit 28B delivers, to the terminal, the all-function permission policy indicating that all functions of the application for which the enable-use condition and the all-function permission condition are satisfied are usable. The all-function permission policy has substantially the same format as that of the partial-function permission policy illustrated in FIG. 6 and corresponds to the policy in which all of the functions are denoted by "○".

In step 514, the policy delivery unit 28B updates the delivered policy in the delivery-policy management DB 20 illustrated in FIG. 4 to "all-function permission policy".

In step 516, the policy delivery unit 28B obtains, from the partial-function-permission-policy DB 24, the partial-function permission policy corresponding to the terminal ID included in the status-change information received in step 100 in FIG. 11.

In step 518, the policy delivery unit 28B determines whether or not the partial-function permission condition in the partial-function permission policy obtained in step 516 is satisfied with respect to the terminal corresponding to the terminal ID included in the status-change information received in step 100 in FIG. 11. When the partial-function permission condition is satisfied, the process proceeds to step 520. When the partial-function permission condition is not satisfied, the process proceeds to step 530.

Whether or not the partial-function permission condition is satisfied is determined, for example, based on the user-status information included in the status-change information received in step 100 in FIG. 11. For example, when the partial-function permission condition is a condition regarding the location, as denoted by No. 7 in the partial-function-permission-policy DB 24 illustrated in FIG. 6, whether or not the partial-function permission condition is satisfied may be determined based on the longitude and latitude of the current location of the terminal, the longitude and latitude being included in the user-status information denoted by No. 4 in the user-status DB 36 illustrated in FIG. 8.

On the other hand, for example, when the partial-function permission condition is a condition regarding the time, as denoted by No. 1 in the partial-function-permission-policy DB 24 in FIG. 6, whether or not the partial-function permission condition is satisfied may be determined based on the current time. For example, for determining whether or not the time in question is within 30 minutes after the end of a meeting, whether or not 30 minutes has passed after the all-function permission condition denoted by No. 1 in the permission-condition DB 22 illustrated in FIG. 5 became unsatisfied from a satisfied state may be determined based on the current time. In addition, for determining whether or not the time in question is within 30 minutes before the start of a meeting, whether or not the current time is within 30 minutes before the start time (16:00) of the meeting, the start time being set by the all-function permission condition, may be determined.

In step 520, by referring to the delivery-application registration DB 18, the application delivery unit 28A determines whether or not any application for which the partial-function permission condition is satisfied is un-delivered. When any application for which the partial-function permission condition is satisfied is un-delivered, the process proceeds to step 522. When the application has been delivered, the process proceeds to step 526.

In step 522, the application delivery unit 28A delivers the application for which the partial-function permission condition is satisfied to the terminal.

In step 524, the application delivery unit 28A updates, in the delivery-application registration DB 18, the delivery state of the application for which the partial-function permission condition is satisfied to "delivered".

In step 526, the policy delivery unit 28B transmits, to the terminal, the partial-function permission policy for the application for which the partial-function permission condition in the partial-function-permission-policy DB 24 is satisfied. The partial-function permission policy has substantially the same format as that of the partial-function permission policy illustrated in FIG. 6 and corresponds to the policy in which one or some of the functions are denoted by "○".

In step 528, the policy delivery unit 28B updates, to "partial-function permission policy", the delivered policy that is included in the delivery-policy management DB 20 that corresponds to the terminal to which the application has been delivered.

In step 530, by referring to the delivery-application registration DB 18, the application delivery unit 28A determines whether or not the application for which the enable-use condition is satisfied and the all-function permission condition and the partial-function permission condition are not satisfied has been delivered to the terminal. When the application has been delivered, the process proceeds to step 532. When the application is un-delivered, this routine ends.

In step 532, the application delivery unit 28A determines whether or not the delivered application is running. When the delivered application is running, the application delivery unit 28A ends this routine. When the delivered application is not running, the process proceeds to step 536. Whether or not the application is running may be determined in a manner described below. For example, when the status-change information indicating that quitting of the corresponding application is not received after the status-change information indicating launching of the application is received, it may be determined the application is running, and when the status-change information indicating quitting of the application is received, it may be determined that the application is not running.

In step 534, by referring to the delivery-application registration DB 18, the application delivery unit 28A determines whether or not, among applications for which the enable-use conditions are not satisfied, an application that has been delivered to the terminal exists. When an application that has been delivered exists, the process proceeds to step 536. When an application that has been delivered does not exist, this routine ends.

In step 536, the application delivery unit 28A transmits, to the terminal, an application delete request so as to delete the delivered application.

In step 538, the application delivery unit 28A updates, to "un-delivered", the delivery state that is included in the delivery-application registration DB 18 and that corresponds to the application for which the delete request was transmitted.

In step 540, the application delivery unit 28A updates, to "un-delivered", the delivered policy that is included in the delivery-policy management DB 20 and that corresponds to the application for which the delete request was transmitted.

Figure 17:
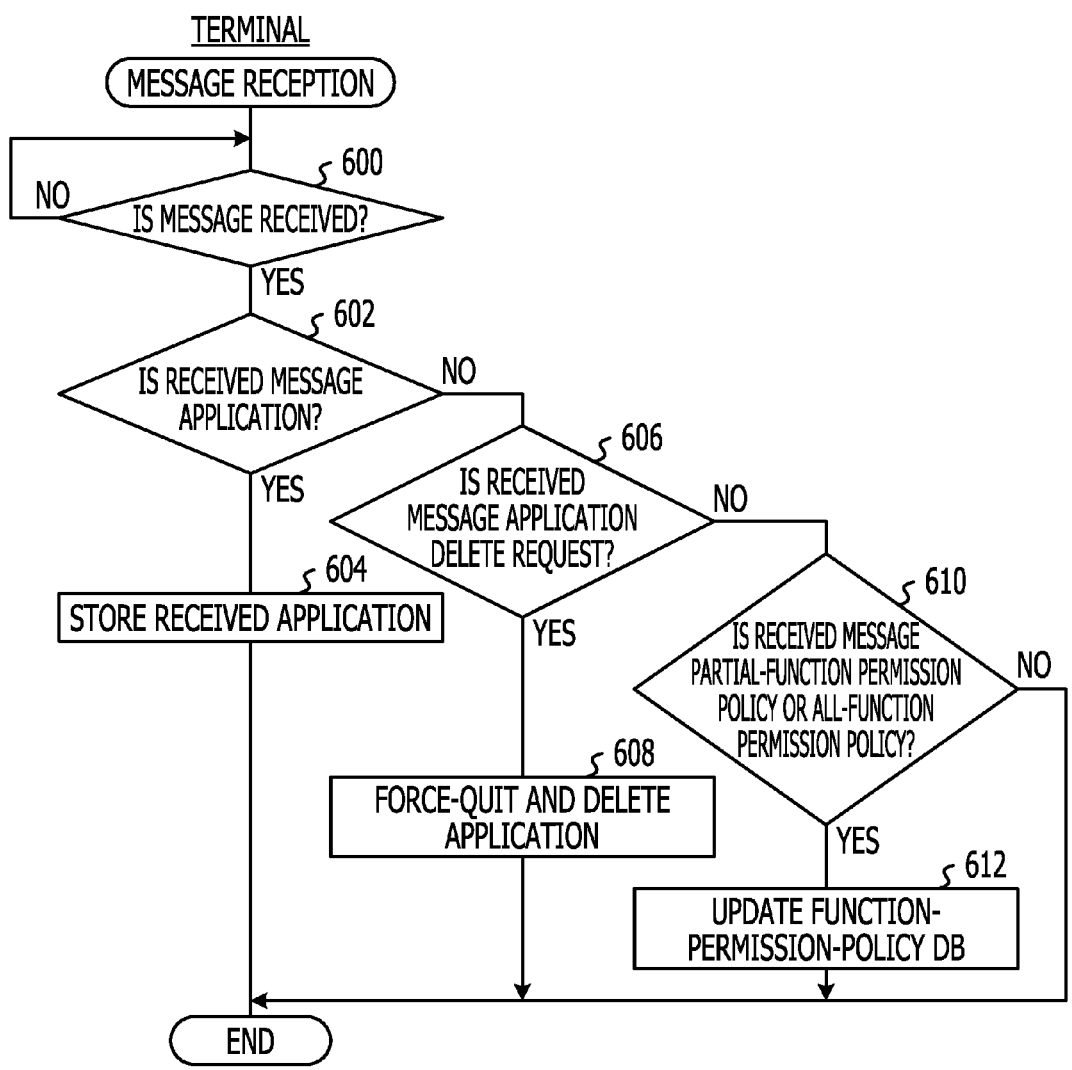
FIG. 17 is a flowchart of message reception processing.

Next, processing executed by the communication terminal apparatus 14 will be described with reference to a flowchart. First, a description will be given of message reception processing illustrated in FIG. 17. The processing illustrated in FIG. 17 is periodically executed.

In step 600, the application receiving unit 40A determines whether or not it receives a message from the application delivery apparatus 12. When the application receiving unit 40A receives a message, the process proceeds to step 602. When the application receiving unit 40A does not receive a message, the application receiving unit 40A waits until it receives a message.

In step 602, the application receiving unit 40A determines whether or not the received message is an application. When the received message is an application, the process proceeds to step 604. When the received message is not an application, the process proceeds to step 606.

In step 604, the application executing unit 44 stores the received application in the application storage unit 42.

In step 606, the application receiving unit 40A determines whether or not the received message is an application delete request. When the received message is an application delete request, the process proceeds to step 608. When the received message is not an application delete request, the process proceeds to step 610.

In step 608, the application executing unit 44 force-quits the application for which the delete request was transmitted and deletes the application from the application storage unit 42.

In step 610, the application receiving unit 40A determines whether the received message is the partial-function permission policy or the all-function permission policy. When the received message is the partial-function permission policy or the all-function permission policy, the process proceeds to step 612. When the received message is neither the partial-function permission policy nor the all-function permission policy, this routine ends.

In step 612, the application executing unit 44 updates the function-permission-policy DB 34 by registering the received partial-function permission policy or all-function permission policy in the function-permission-policy DB 34.

Figure 18:
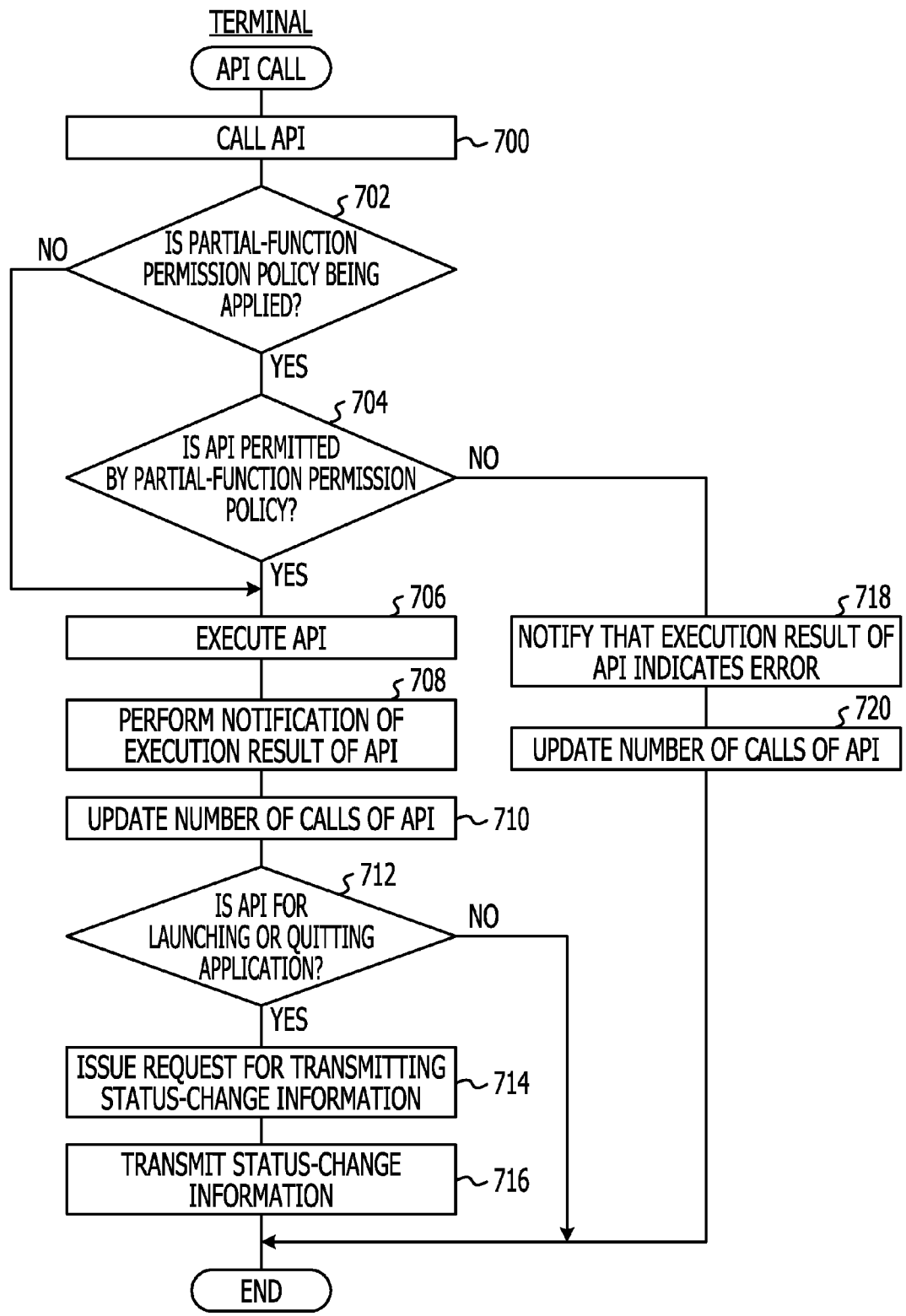
FIG. 18 is a flowchart of API call processing.

Next, API call processing will be described with reference to the flowchart illustrated in FIG. 18. This processing is executed when the user gives an instruction for executing a function or functions of an application. Each function of the application is executed through calling of an API corresponding to the function for which the execution instruction is given.

In step 700, the application executing unit 44 requests the API unit 46 so as to call an API corresponding to the function for which the execution instruction is given.

In step 702, by referring to the function-permission-policy DB 34, the application executing unit 44 determines whether or not the policy applied to an application being executed is the partial-function permission policy. This determination may be made in such a manner that, when all of the functions in the function-permission-policy DB 34 are denoted by "○", the policy in question is the all-function permission policy, and when one or some of the functions are denoted by "○", the policy in question is the partial-function permission policy. When the policy applied to the application being executed is the partial-function permission policy, the process proceeds to step 704. When the policy applied to the application being executed is not the partial-function permission policy, that is, is the all-function permission policy, the process proceeds to step 706.

In step 704, the application executing unit 44 determines whether or not the API called in step 700 is an API permitted by the partial-function permission policy. That is, the application executing unit 44 determines whether or not the function corresponding to the called API is denoted by "○". When the API called in step 700 is an API permitted by the partial-function permission policy, the process proceeds to step 706. When the API called in step 700 is not an API permitted by the partial-function permission policy, the process proceeds to step 718.

In step 706, the API unit 46 executes the API called in step 700.

In step 708, the API unit 46 notifies the application executing unit 44 of an execution result of the API.

In step 710, the application executing unit 44 updates the value of the number of calls of the corresponding API in the number-of-API-calls DB 38. That is, the application executing unit 44 increments the value of the number of calls of the corresponding API.

In step 712, the application executing unit 44 determines whether or not the called API is an API for launching an application or quitting an application. When the called API is an API for launching an application or quitting an application, the process proceeds to step 714. When the called API is an API for neither launching an application nor quitting an application, this routine ends.

In step 714, the application executing unit 44 requests the status-change transmitting unit 52 so as to transmit status-change information indicating that the status has changed. That is, when the called API is an API for launching an application, the application executing unit 44 requests the status-change transmitting unit 52 so as to transmit status-change information including information indicating that an application has been launched and number-of-application-API-calls information corresponding to the launched application, the number-of-application-API-calls information being registered in the number-of-API-calls DB 38. On the other hand, when the called API is an API for quitting an application, the application executing unit 44 requests the status-change transmitting unit 52 so as to transmit status-change information including information indicating that an application has been quit and number-of-application-API-calls information corresponding to the quit application, the number-of-API-calls information being registered in the number-of-API-calls DB 38.

In step 716, the status-change transmitting unit 52 transmits the status-change information, requested by the application executing unit 44, to the server.

On the other hand, in step 718, the API unit 46 notifies the application executing unit 44 that the execution result of the API indicates an error.

In step 720, the application executing unit 44 updates the value of the number of calls of the corresponding API in the number-of-API-calls DB 38. That is, the application executing unit 44 increments the value of the number of calls of the corresponding API.

Next, user-status recognizing processing will be described with reference to the flowchart illustrated in FIG. 19.

In step 800, the user-status recognizing unit 50 turns off a flag indicating that the user-status DB 36 has been updated.

In step 802, the user-status recognizing unit 50 obtains a list of user-status types from the user-status DB 36.

In step 804, the user-status recognizing unit 50 obtains GPS information from the sensing unit 48. That is, the user-status recognizing unit 50 obtains the longitude-and-latitude information of the communication terminal apparatus 14.

In step 806, with respect to each of the obtained user-status types, the user-status recognizing unit 50 determines whether or not any user-status type whose status has changed from the "current status" exists. For example, the user-status type denoted by No. 1 in FIG. 8 is "status inside/outside company" indicating whether the current location of the communication terminal apparatus 14 is inside the company or outside the company, and the "current status" is "inside company". In this case, based on the longitude-and-latitude information obtained in step 804, the user-status recognizing unit 50 determines that a case in which the current location of the communication terminal apparatus 14 has changed from inside the company to outside the company is a case in which the "current status has changed". Conversely, when the "current status" is "outside company", the user-status recognizing unit 50 determines that a case in which the current location of the communication terminal apparatus 14 has changed from outside the company to inside the company is a case in which the "current status" has changed. For example, the user-status type denoted by No. 3 in FIG. 8 is "time slot", and the "current status" is "between 16:00 and 17:00". In this case, for example, when the time reaches 17:00, the user-status recognizing unit 50 determines that the "current status" has changed.

Thus, the user-status recognizing unit 50 determines whether or not the current status has changed for each user-status type. When any user-status type whose current status has changed exists, the process proceeds to step 808. When any user-status type whose current status has changed does not exist, the process proceeds to step 812.

In step 808, the user-status recognizing unit 50 updates the "current status" in the user-status DB 36 to the post-change status.

In step 810, the user-status recognizing unit 50 turns on the flag indicating that the user-status DB 36 has been updated.

In step 812, the user-status recognizing unit 50 determines whether or not the flag indicating that the user-status DB 36 has been updated is on. When the flag indicating that the user-status DB 36 has been updated is on, the process proceeds to step 814. When the flag indicating that the user-status DB 36 has been updated is off, this routine ends.

In step 814, the user-status recognizing unit 50 requests the status-change transmitting unit 52 so as to transmit, to the server, status-change information including the user-status information whose "current status" has changed, the user-status information being included in the user-status information registered in the user-status DB 36.

In step 816, the status-change transmitting unit 52 transmits, to the server, status-change information including the user-status information whose status has changed among the user-status information registered in the user-status DB 36 and the number-of-API-calls information registered in the number-of-API-calls DB 38.

In the first embodiment, as described above, the all-function permission policy or the partial-function permission policy is delivered to the terminal separately from an application, and when the partial-function permission condition is satisfied even in a case in which the all-function permission condition is not satisfied, the execution of the application is enabled with the function(s) being limited.

Thus, for example, it is possible to significantly reduce the possibility that an application is deleted and made unusable right after the user who is using the meeting application A leaves a meeting room. In addition, since the user is allowed to use one or some of the functions of the meeting application A when he or she approaches the meeting room even before entering the meeting room, this makes it possible for him or her to examine materials for the meeting in advance. That is, this arrangement makes it possible to allow an application to be appropriately used according to the status of the communication terminal apparatus 14.

In addition, since the partial-function permission policy is delivered to the terminal separately from the application, it is possible to restrict the functions of an application without delivering the application a number of times each time the status changes. This makes it possible to suppress an increase in a communication load.

In addition, as illustrated in FIG. 6, the partial-function permission condition regarding the location and the partial-function permission condition regarding the time may also be set independently from each other. Thus, for example, the arrangement may be such that, as denoted by No. 6 in FIG. 6, execution of a file-write function of the meeting application A is not permitted and sound recording is permitted for 30 minutes after the end of a meeting, and as denoted by No. 7 in FIG. 6, execution of the file-write function is permitted and the sound recording is not permitted in a range of 3 m from the meeting room.

A logical conjunction "AND" condition in the partial-function permission condition denoted by Nos. 6 and 7 may also be set as the partial-function permission condition, as denoted by No. 8 in FIG. 6. In this case, AND of the functions denoted by No. 6 and 7 may be determined for determining whether or not each function is permitted.

The arrangement may also be such that the partial-function permission condition is separated into multiple steps and the number of functions to be permitted increases or decreases in a stepwise manner. For instance, in the example denoted by No. 1 in FIG. 6, a partial-function permission policy in which the partial-function permission condition is "within 30 minutes before start and after end of meeting" and only the function 1 is denoted by "○" is set. In this case, for example, a partial-function permission policy in which the partial-function permission condition is "within 20 minutes before start and after end of meeting" and only the functions 1 and 2 are denoted by "○" and a partial-function permission policy in which the partial-function permission condition is "within 10 minutes before start and after end of meeting" and only the functions 1 to 3 are denoted by "○" are further set. With these settings, for example, as the time passes from the end of the meeting, the number of usable functions decreases in a stepwise manner. The number of usable functions also increases in a stepwise manner, as the meeting time approaches before the start of the meeting. Accordingly, it is possible to improve the usability of the applications.

Second Embodiment

Next, a description will be given of a second embodiment in the disclosed technology. Portions that are the same as or similar to those in the first embodiment are denoted by the same reference numerals, descriptions thereof will not be given, and portions that are different from those in the first embodiment will be mainly described hereinafter.

In the second embodiment, a description will be given of a case in which, when the partial-function permission condition for an application to be exclusively executed overlap another partial-function condition for an application, an exclusive switching condition for that application is calculated, and the application is exclusively executed according to the calculated exclusive switching condition. For example, for receiving visitors who visit a company, it is desirable that a material application for a visitor a and a material application for a visitor b be used exclusively from each other. This is to avoid the mistake of presenting the visitor b with the material for the visitor a.

For example, in a fieldwork aiding system, there are cases in which applications for displaying operating manuals for respective machines in a machine room c and a machine room d located a little away from each other on the same floor are delivered to the corresponding locations. In such a case, exclusion control is also performed in order to inhibit a mistake, such as displaying, to the machine room d, the operating manual for the machine room c. Accordingly, in the second embodiment, a condition for exclusively switching an application is calculated, and the application is executed exclusively according to the calculated exclusive switching condition.

Figure 20:
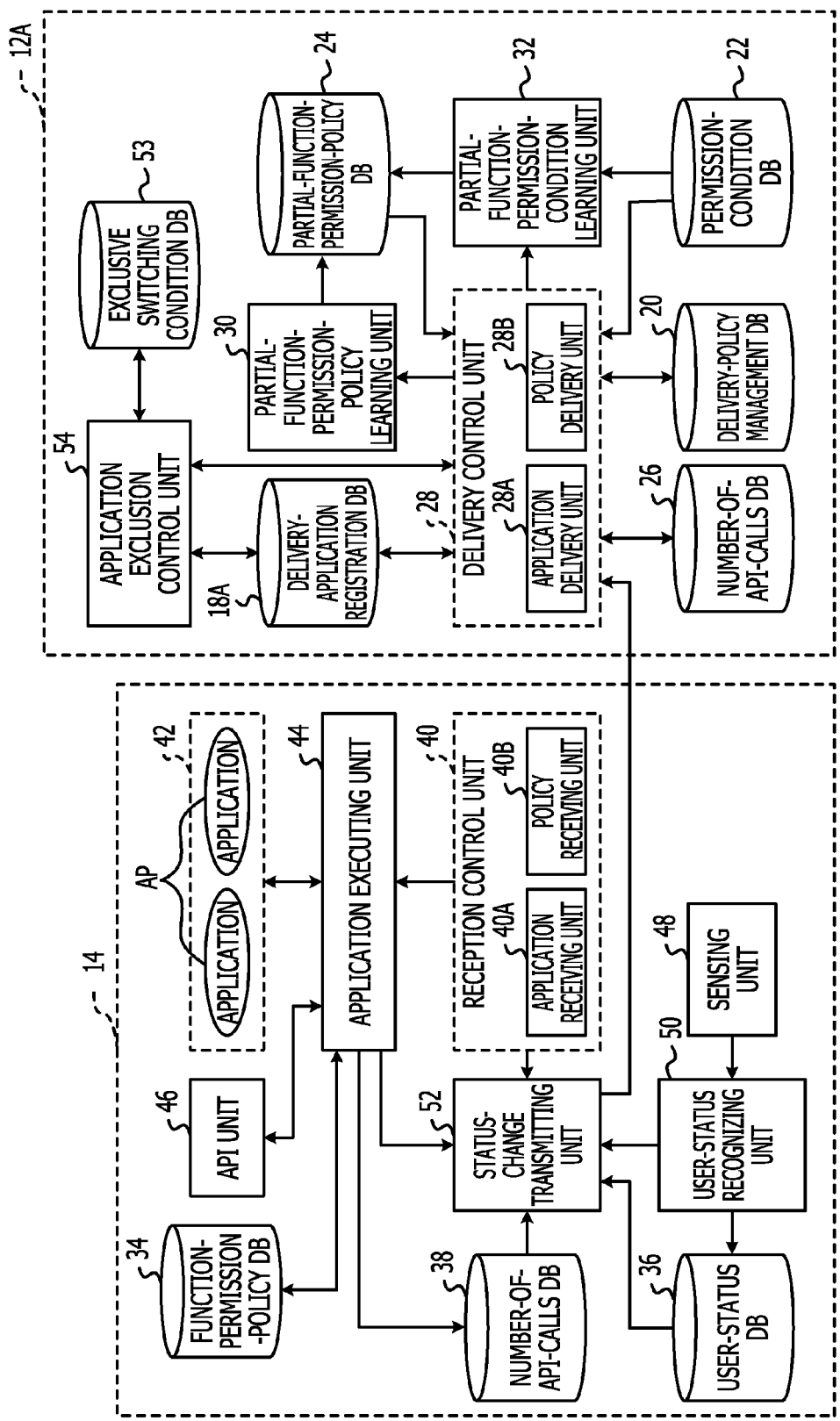
FIG. 20 is a block diagram illustrating an application delivery apparatus and a communication terminal apparatus according to a second embodiment.

FIG. 20 illustrates an application delivery apparatus 12A according to the second embodiment. The application delivery apparatus 12A is different from the application delivery apparatus 12 illustrated in FIG. 2 in that an exclusive switching condition DB 53 and an application exclusion control unit 54 are provided and a delivery-application registration DB 18A has an exclusive tag list. Since other portions are substantially the same, descriptions thereof are not given hereinafter.

As illustrated in FIG. 21, the exclusive switching condition DB 53 is a database in which exclusive-switching-condition information, including user IDs, terminal IDs, application names, and exclusive switching conditions, is registered.

As illustrated in FIG. 22, the delivery-application registration DB 18A has a "user ID" field, a "terminal ID" field, an "application name" field, the "exclusive tag" field, and the "delivery status" field. When this "exclusive tag" field is blank, this indicates that another application be exclusively executed does not exist. When the "exclusive tag" field is not blank, this indicates that the application in question is to be executed exclusively from the application stated in the "exclusive tag" field.

For example, in the example in FIG. 22, since both of the exclusive tag for a material application for the visitor a denoted by No. 4 and the exclusive tag for a material application for the visitor b denoted by No. 5 indicate "material for visitor", this indicates that they are applications to be exclusively executed. In addition, since the "exclusive tag" for a schedule application denoted by No. 2 is blank, this indicates that this schedule application may be executed simultaneously with, for example, the material application for the visitor a.

When the partial-function permission condition for an application to be exclusively executed overlap another partial-function permission condition for an application, the application exclusion control unit 54 calculates an exclusive switching condition for that application and adjusts the switching timing, based on the exclusive switching condition DB 53.

Figure 23:
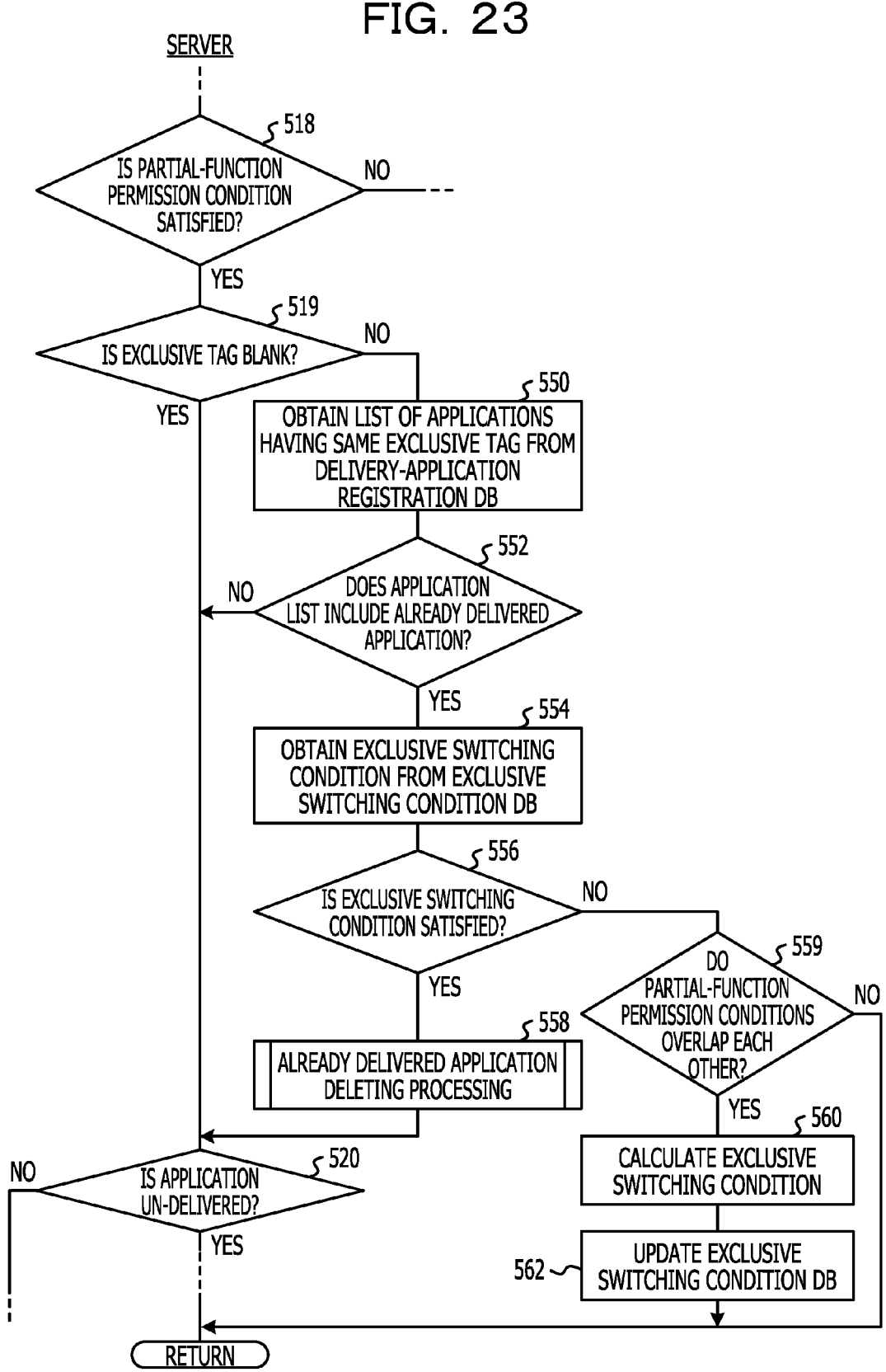
FIG. 23 is a flowchart of application exclusion control processing.

Next, a description will be given of an operation of the second embodiment. FIG. 23 is a flowchart of application exclusion control according to the second embodiment.

As illustrated in FIG. 23, the application exclusion control corresponds to processes in steps 519 and 550 to 562 interposed between step 518 and step 520 for the terminal-application-policy delivery control illustrated in FIG. 16. Since other processes are substantially the same as those in the terminal-application-policy delivery control illustrated in FIG. 16, detailed descriptions thereof are not given.

In step 519, by referring to the delivery-application registration DB 18A, the application exclusion control unit 54 determines whether or not the exclusive tag for an application for which the partial-function permission condition is satisfied is blank. When the exclusive tag is blank, the process proceeds to step 520; otherwise, the process proceeds to step 550.

In step 550, by referring to the delivery-application registration DB 18A, the application exclusion control unit 54 obtains a list of applications having the same exclusive tag from the delivery-application registration DB 18A.

In step 552, by referring to the delivery-application registration DB 18A, the application exclusion control unit 54 determines whether or not the obtained application list includes an already delivered application. When the obtained application list includes an already delivered application, the process proceeds to step 554. When the application list does not include an already delivered application, the process proceeds to step 520.

In step 554, the application exclusion control unit 54 obtains the exclusive switching condition for the already delivered application from the exclusive switching condition DB 53.

In step 556, the application exclusion control unit 54 determines whether or not the exclusive switching condition for the already delivered application is satisfied. When the exclusive switching condition is satisfied, the process proceeds to step 558. When the exclusive switching condition is not satisfied, the process proceeds to step 559.

In step 558, already delivered application deleting processing is executed. Since this deletion processing is substantially the same as the processes in steps 534 to 540 illustrated in FIG. 16, a description thereof is not given hereinafter.

In step 559, a determination is made as to whether or not the partial-function permission conditions overlap each other. When the partial-function permission conditions overlap each other, the process proceeds to step 560. When the partial-function permission conditions do not overlap each other, this routine ends. Now, a specific description will be given of a determination as to whether or not the partial-function permission conditions overlap each other. First, a description will be given of a determination as to whether or not partial-function permission conditions regarding time overlaps.

Figure 24:
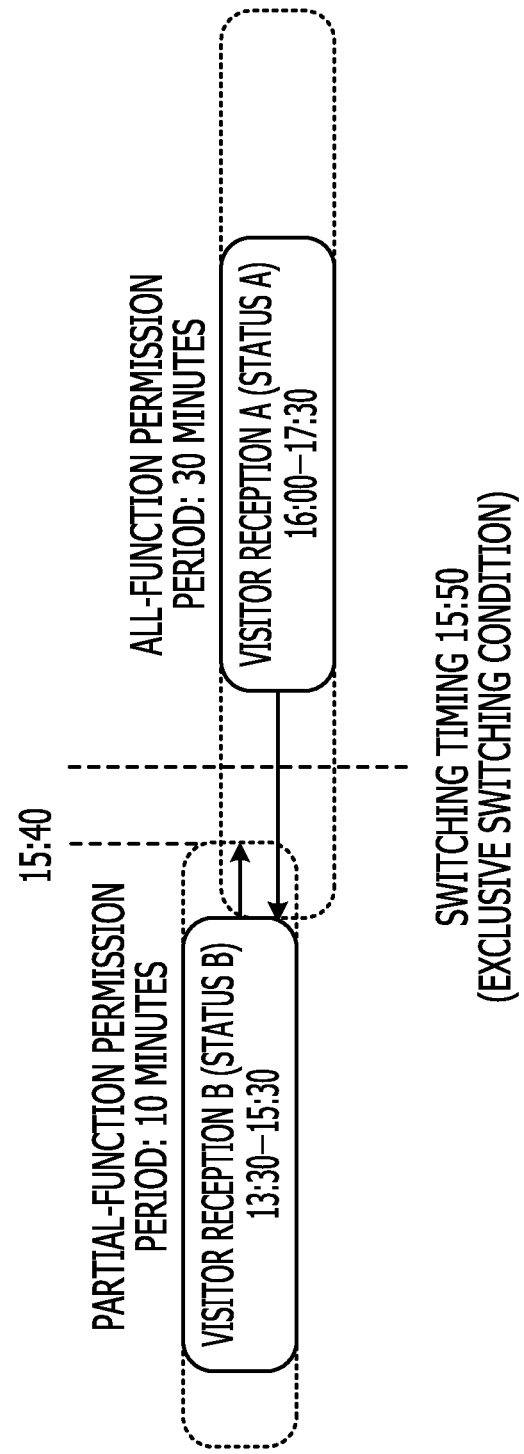
FIG. 24 illustrates an exclusive switching condition for an application.

For example, it is assumed that, as denoted by Nos. 3 and 4 in the permission-condition DB 22 in FIG. 5, visitor-receiving time in the all-function permission condition for the material application for the visitor a is 13:30 to 15:30 and visitor-receiving time in the all-function permission condition for the material application for the visitor b is 16:00 to 17:30. It is also assumed that, as denoted by Nos. 2 and 4 in the partial-function-permission-policy DB 24 in FIG. 6, the partial-function permission condition for the material application for the visitor a is "within 10 minutes before start and after end of visitor reception" and the partial-function permission condition for the material application for the visitor b is "within 30 minutes before start and after end of visitor reception". In this case, as illustrated in FIG. 24, some the functions of the material application for the visitor a are permitted until 15:40, and some of the functions of the material application for the visitor b are permitted from 15:30. Thus, the execution of the material application for the visitor a and the execution of the material application for the visitor b, which are to be exclusively executed, overlap each other between 15:30 and 15:40. That is, when an extended end time of one or some of the functions of the material application for the visitor a to be executed earlier is later than a prior start time of one or some of the functions of the material application for the visitor b to be executed later, it may be determined that the execution of the material application for the visitor a and the execution of the material application for the visitor b overlap each other.

Next, a description will be given of a case in which a determination is made as to whether or not partial-function permission conditions regarding the location overlap each other.

For example, it is assumed that, as denoted by Nos. 3 and 4 in the permission-condition DB 22 in FIG. 5, the location in the all-function permission condition for the material application for the visitor a is "inside reception room J" and the location in the all-function permission condition for the material application for the visitor b is "inside reception room K".

It is also assumed that, as denoted by Nos. 3 and 5 in the partial-function-permission-policy DB 24 in FIG. 6, the partial-function permission condition for the material application for the visitor a is "within 5 m in vicinity of reception room J" and the partial-function permission condition for the material application for the visitor b is "within 3 m in vicinity of reception room K".

In this case, some of the functions of the material application for the visitor a are permitted within 5 m in the vicinity of reception room J, and some of the functions of the material application for the visitor b are permitted within 3 m in the vicinity of reception room K. In this case, when reception room J and reception room K are located close to each other, there are cases in which the executable ranges of the material application for the visitor b and the material application for the visitor a, which are to be exclusively executed, overlap each other. Accordingly, a determination is made as to whether or not the executable ranges overlap each other, based on the locations of reception room J and reception room K and the partial-function permission condition for the material application for the visitor a and the partial-function permission condition for the material application for the visitor b. For instance, in the above example, when the distance between reception room J and reception room K is within 8 (=5+3) m, it may be determined that the executable range of the material application for the visitor a and the executable range of the material application for the visitor b overlap each other.

In step 560, the application exclusion control unit 54 calculates an exclusive switching condition such that an application to be exclusively executed is exclusively executed.

First, a description will be given of an exclusive switching condition regarding time. As in the example described above, some of the functions of the material application for the visitor a are permitted until 15:40, and some of the functions of the material application for the visitor b are permitted from 15:30. Thus, in the period between 15:30 and 15:40, the execution of the material application for the visitor a and the execution of the material application for the visitor b, which are to be exclusively executed, overlap each other. Accordingly, the time "15:50", which is a middle between the extended end time "15:40" of some of the functions of the material application for the visitor a and the start time "16:00" at which all of the functions of the material application for the visitor b are permitted, is set as the application switching timing, as denoted by No. 1 in FIG. 21.

A specific switching timing t may be calculated by:

$$t = E1 + (A1 \times w1 + B1 \times w2)/2 \quad (1)$$

In this case, E1 indicates the date and time when an application to be executed earlier is quit out of two applications to be exclusively executed. In the above-described example, since the date and time when the material application for the visitor a to be executed earlier is quit is 15:30, E1 is 15:30. A1 denotes an amount of prior execution of the application to be executed later out of two applications to be exclusively executed, that is, an amount of time by which the application may be executed prior to satisfaction of the all-function permission condition, the amount of time being defined by the partial-function permission condition. In the above-described example, since the partial-function permission condition for the material application for the visitor b to be executed later is "within 30 minutes before start and after end of visitor reception", the amount of prior execution is "30 minutes". B1 also denotes the amount of extended time of the application to be executed earlier out of two applications to be exclusively executed, that is, the amount of extended time by which the application may be executed after the all-function permission condition becomes unsatisfied, the amount of extended time being defined by the partial-function permission condition. In the example described above, since the partial-function permission condition for the material application for the visitor a to be executed earlier is "within 10 minutes before start and after end of visitor reception", the amount of extended time is "10 minutes". Also, w1 and w2 indicate weights and are assumed to be "1" in this case.

Thus, according to equation (1) noted above, t=15:30+ (30×1+10×1)/2=15:50 is given, and the switching timing t is 15:50.

Next, a description will be given of an exclusive switching condition regarding a location. As in the example described above, some of the functions of the material application for the visitor a are permitted within 5 m in the vicinity of reception room J, and some of the material application for the visitor b are permitted within 3 m in the vicinity of reception room K. Thus, when the distance between reception room J and reception room K is within 8 m, the executable range of the material application for the visitor a and the executable range of the material application for the visitor b overlap each other. Hence, a position at 4 m from reception room J is set as a switching position for the application, as denoted by No. 2 in FIG. 21.

A specific switching position p may be calculated by:

$$p=E2+(A2\times w1+B2\times w2)/2 \qquad (2)$$

In this case, E2 denotes the position where an application to be executed earlier out of two applications to be exclusively executed is quit. In the example described above, since the position where the material application for the visitor a to be executed earlier is quit is in reception room J, E2 is a position in reception room J. A2 denotes an amount of prior execution of the application to be executed later out of two applications to be exclusively executed, that is, a position by which the application may be executed prior to satisfaction of the all-function permission condition, the position being defined by the partial-function permission condition. In the example described above, since the partial-function permission condition for the material application for the visitor b to be executed later is "within 3 m in vicinity of reception room K", the amount of prior execution is "3 m". B2 also denotes the amount of extended position of the application to be executed earlier out of two applications to be exclusively executed, that is, the extended position by which the application may be executed after the all-function permission condition becomes unsatisfied, the extended position being defined by the partial-function permission condition. In the example described above, since the partial-function permission condition for the material application for the visitor a to be executed earlier is "within 5 m in vicinity of reception room J", the amount of extended position is "5 m". Also, w1 and w2 indicate weights and are assumed to be "1" in this case.

Thus, equation (2) noted above yields p="position in reception room J"+(3×1+5×1)/2="position in reception room J"+4, and thus the switching position p is "reception room J"+4 m.

In step 562, the application exclusion control unit 54 updates the exclusive switching condition DB 53 with the exclusive switching condition calculated in step 560.

Thus, in the second embodiment, since the condition for switching applications to be exclusively executed is adjusted when the partial-function permission conditions for the applications overlap each other, it is possible to avoid overlapping of executions of the applications to be exclusively executed.

In the second embodiment, the applications are exclusively executed by adding application exclusion control processing as illustrated in FIG. 23, rather than adjusting the partial-function permission condition and the enable-use condition. This is because it is more convenient when a typical partial-function permission condition can be directly used in a case in which an application may be used non-exclusively, such as a case in which there is only one party of visitors or there is only one task at a work site.

Third Embodiment

Next, a description will be given of a third embodiment according to the disclosed technology. Portions that are the same as or similar to those in the first embodiment are denoted by the same reference numerals, descriptions thereof will not be given, and portions that are different from those in the first embodiment will be mainly described hereinafter.

In a third embodiment, a description will be given of a case in which the partial-function permission condition is satisfied based on history of the user status. Examples of such a case include a case in which execution of an application for a client's place B is permitted only when the user is visiting the client's place B within a certain period of time after visiting a client's place A during visit of client's places through a specific route for routine sales or the like.

Figure 25:
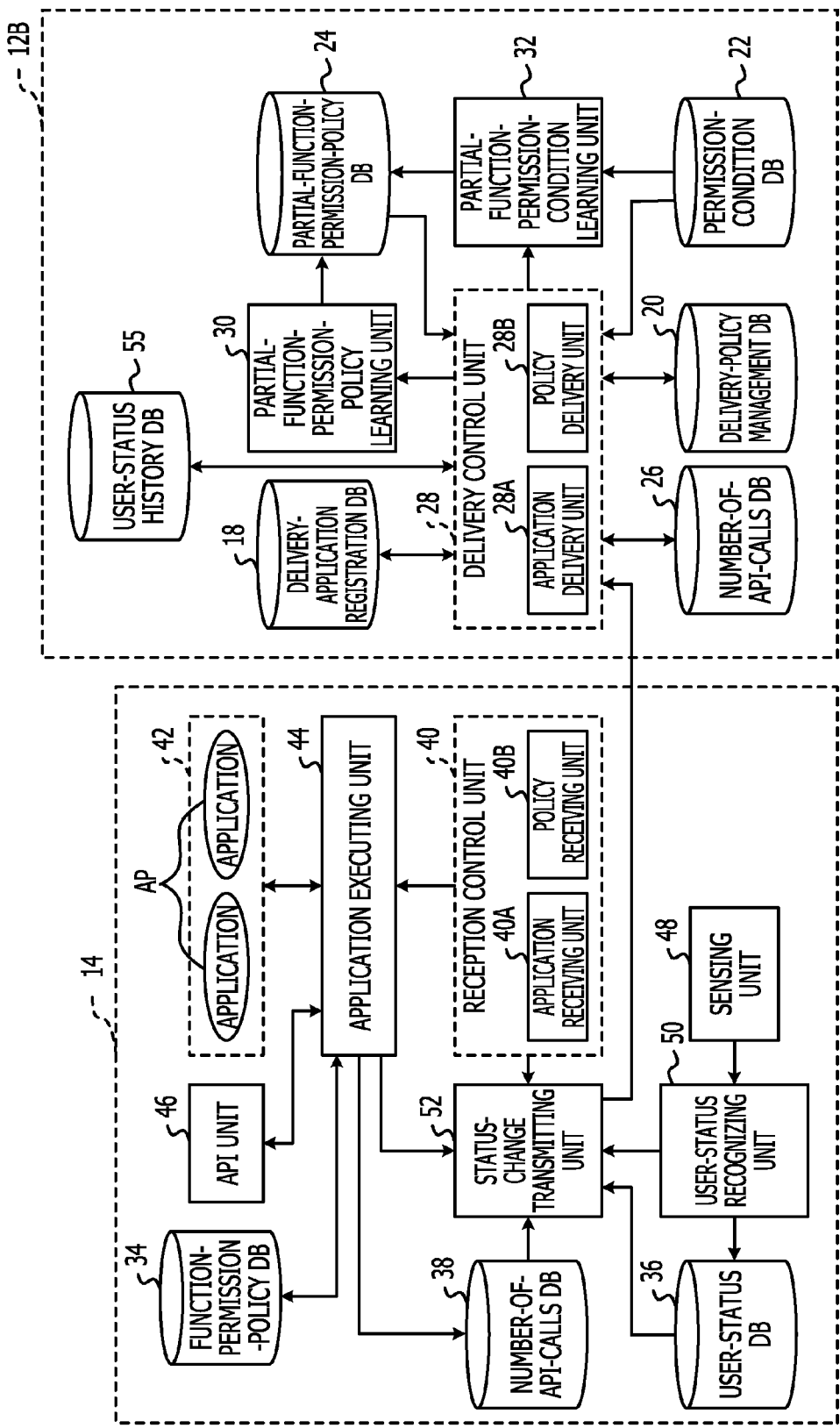
FIG. 25 is a block diagram illustrating an application delivery apparatus and a communication terminal apparatus according to a third embodiment.

FIG. 25 illustrates an application delivery apparatus 12B according to the third embodiment. The application delivery apparatus 12B is different from the application delivery apparatus 12 illustrated in FIG. 2 in that a user-status history DB 55 is provided. Since other portions are substantially the same, descriptions thereof are not given hereinafter.

As illustrated in FIG. 26, the user-status history DB 55 is a database in which dates and times, user-status types, and user statuses are registered.

In the user-status DB 36 in the communication terminal apparatus 14, for example, "location" is set as the user-status type, as denoted by No. 5 in FIG. 8. When the location of the communication terminal apparatus 14 changes, the "current status" is updated and status-change information including this user-status information is transmitted to the server.

The server registers, in the user-status history DB 55, the user-status information including the status-change information transmitted from the communication terminal apparatus 14. As a result, the history of the location of the terminal is registered in the user-status history DB 55.

For example, as indicated by the permission-condition information denoted by No. 5 in the permission-condition DB 22 illustrated in FIG. 5, the enable-use condition for "meeting application B" is set to "site D", and the all-function permission condition is set to "location is site D and the terminal was at site C within past 8 hours".

In addition, as indicated by a partial-function permission policy denoted by No. 9 in the partial-function-permission-policy DB 24 illustrated in FIG. 6, the partial-function permission condition for the "meeting application B" is set to "site D".

In this case, for example, the site D is a meeting room, and the site C is the front gate or the like of the company. In such a case, all of the functions of meeting application B are permitted when the terminal was present at site C within the past 8 hours and also the same terminal is currently located at site D. In such a manner, execution of all of the functions of meeting application B are enabled only when the terminal arrives at site D within a certain period of time after traveling through site C. This makes it possible to significantly reduce the possibility that someone illegally enters the premises without going through the front gate and executes meeting application B.

Fourth Embodiment

Next, a description will be given of a fourth embodiment of the disclosed technology. Portions that are the same as or similar to those in the first embodiment are denoted by the same reference numerals, descriptions thereof will not be given, and portions that are different from those in the first embodiment will be mainly described hereinafter.

In the fourth embodiment, a description will be given of a case in which whether or not the partial-function permission condition is satisfied is determined considering the transfer time of an application.

Figure 27:
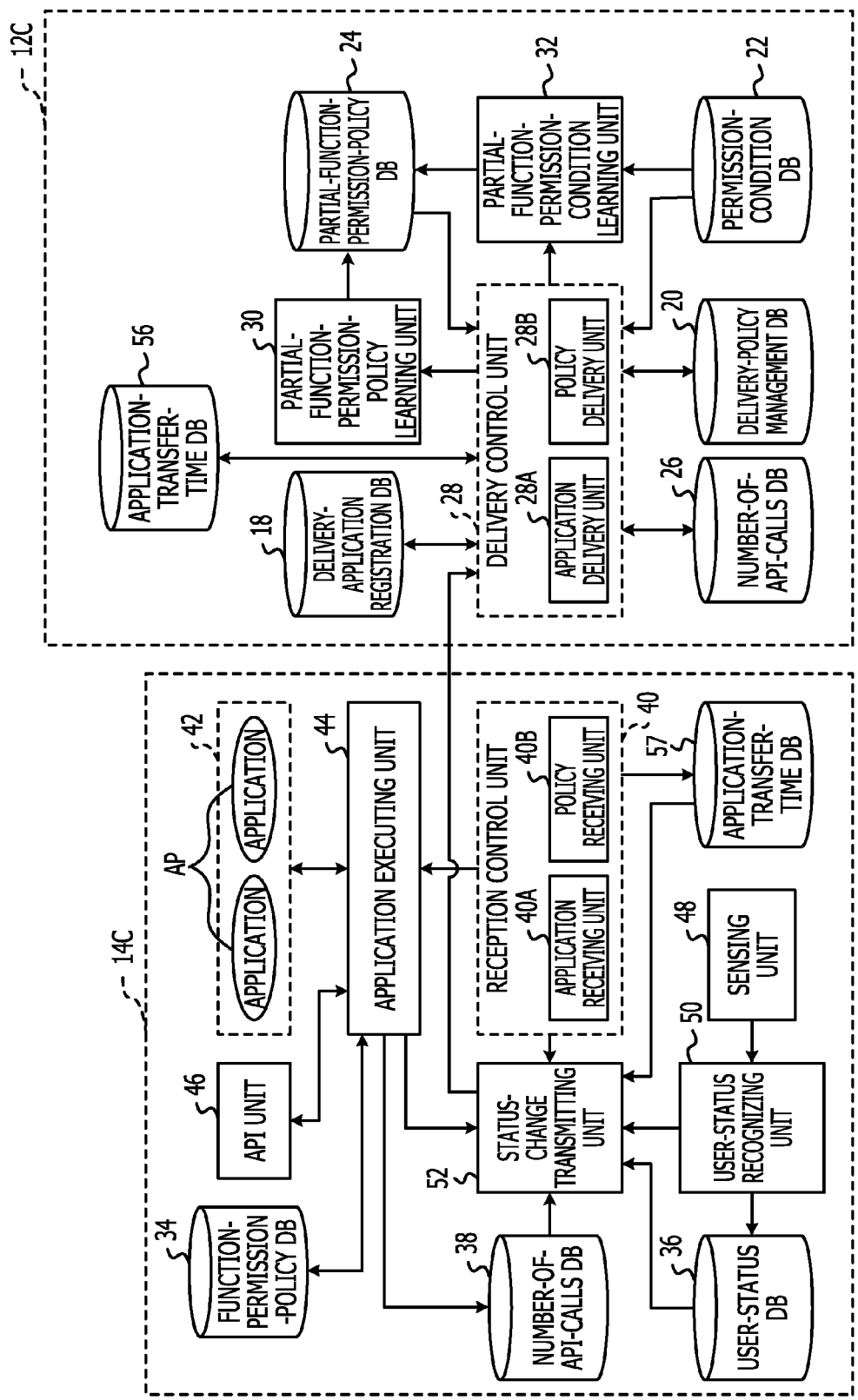
FIG. 27 is a block diagram of an application delivery apparatus and a communication terminal apparatus according to a fourth embodiment.

FIG. 27 illustrates an application delivery apparatus 12C and a communication terminal apparatus 14C according to the fourth embodiment. The application delivery apparatus 12C is different from the application delivery apparatus 12 illustrated in FIG. 2 in that an application-transfer-time DB 56 is provided. Since other portions are substantially the same, descriptions thereof are not given hereinafter. The communication terminal apparatus 14C is also different from the communication terminal apparatus 14 illustrated in FIG. 2 in that an application-transfer-time DB 57 is provided. Since other portions are substantially the same, descriptions thereof are not given hereinafter.

As illustrated in FIG. 28, the application-transfer-time DB 56 is a database in which application-transfer-time information, including terminal IDs, application names, transfer sizes, and transfer times, is registered.

As illustrated in FIG. 29, the application-transfer-time DB 57 is a database in which application-transfer-time information, including application names, transfer sizes, and transfer times, is registered.

Figure 30:
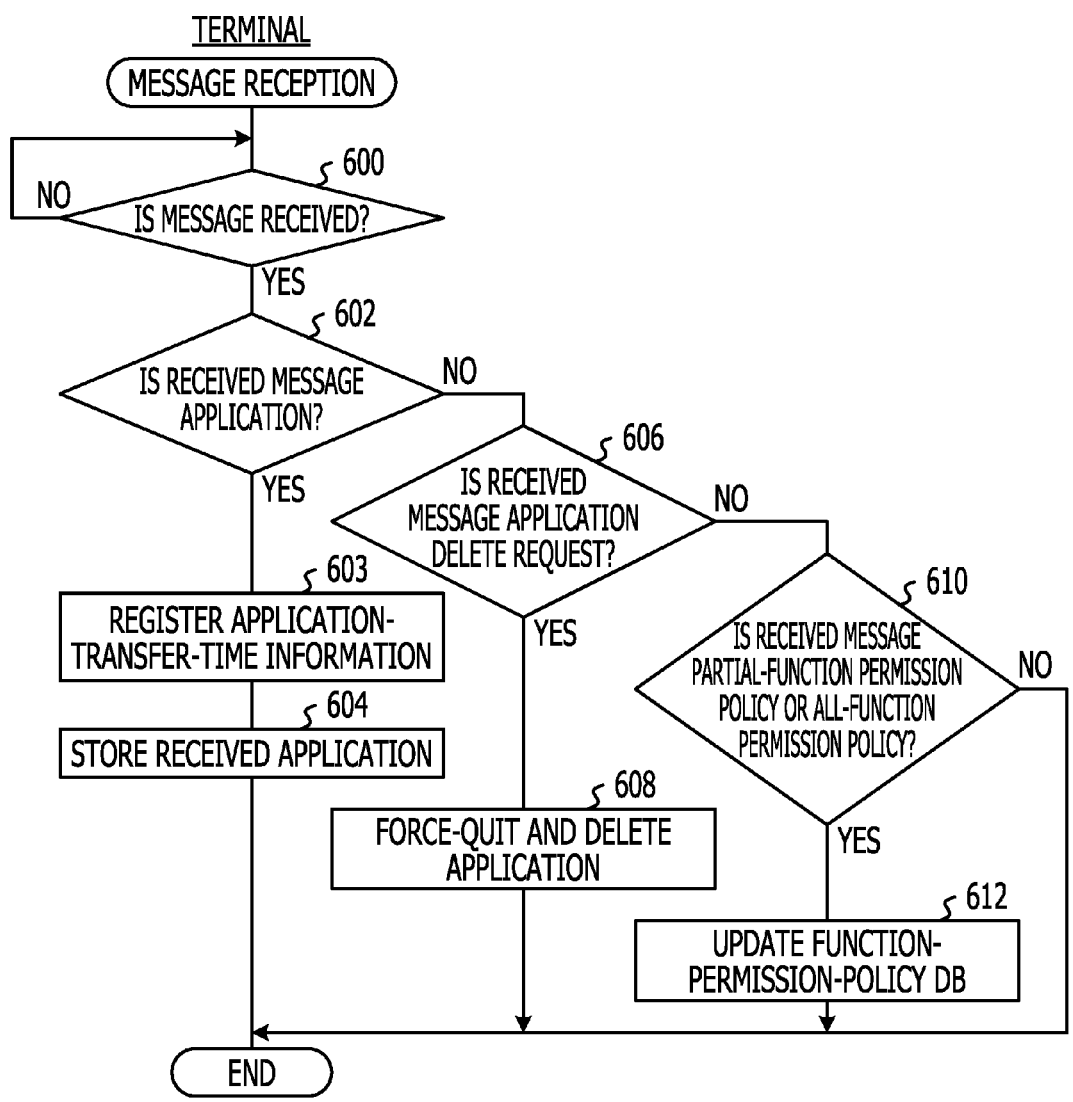
FIG. 30 is a flowchart of message reception processing.

Next, a description will be given of an operation of the fourth embodiment. FIG. 30 is a flowchart illustrating message reception processing executed by the terminal according to the fourth embodiment.

The processing in FIG. 30 is different from the processing in FIG. 17 in that a process in step 603 is added. Since other processes are analogous to those in FIG. 17, descriptions thereof are not given hereinafter.

In step 603, transfer time information of a received application is registered in the application-transfer-time DB 57.

Figure 19:
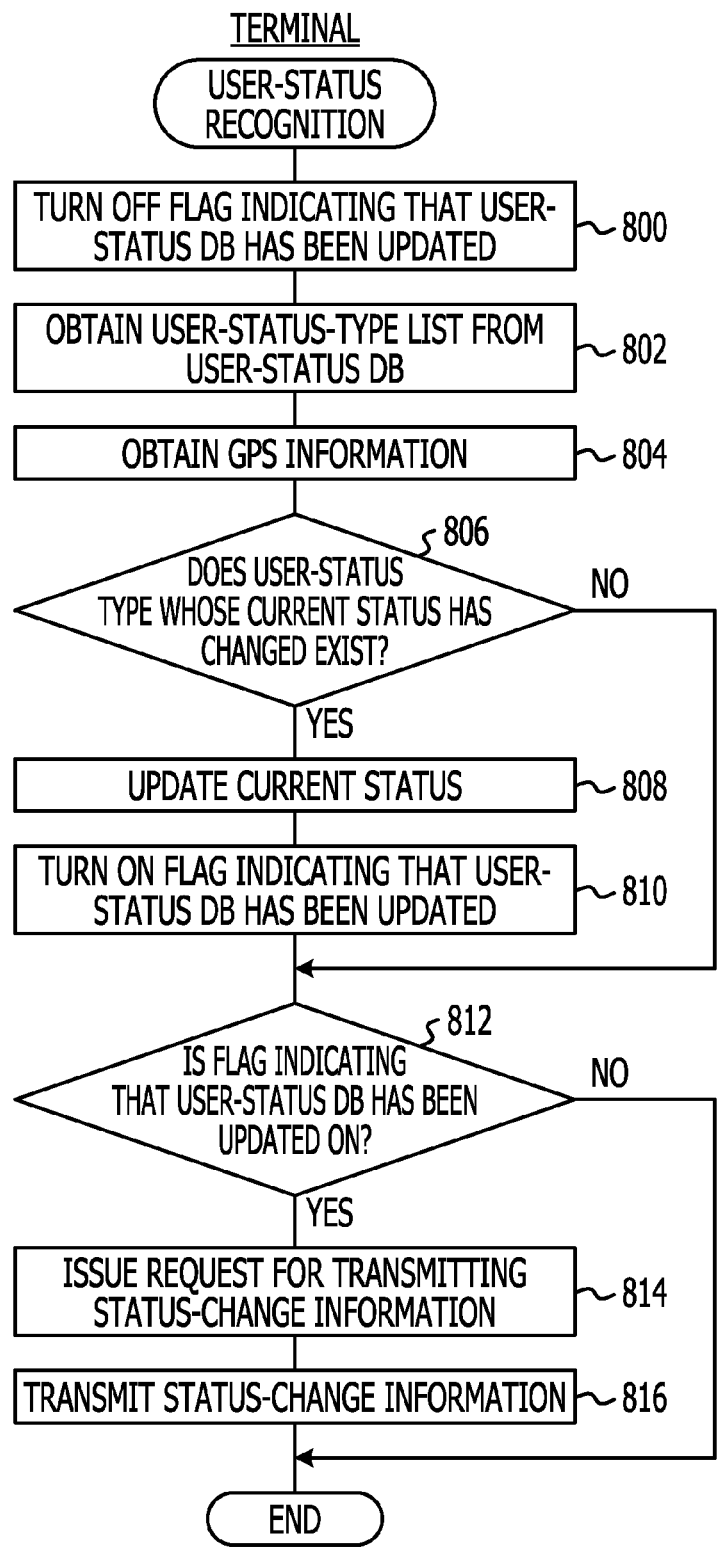
FIG. 19 is a flowchart of user-status recognizing processing.

In this case, in step 814 in FIG. 19, the terminal transmits, to the server, status-change information including the application-transfer-time information registered in the application-transfer-time DB 57.

In turn, upon receiving the status-change information in step 100 in FIG. 11, the server registers, in the application-transfer-time DB 56, the application-transfer-time information included in the received status-change information.

In step 518 in FIG. 16, the server also adjusts the partial-function permission condition, based on the application transfer time registered in the application-transfer-time DB 56, and determines whether or not the partial-function permission condition after the adjustment is satisfied.

For example, it is assumed that the partial-function permission condition for "meeting application A" is "within 30 minutes before start and after end of meeting", as in the partial-function permission policy denoted by No. 1 in the partial-function-permission-policy DB 24 illustrated in FIG. 6. It is also assumed that the transfer time of "meeting application A" is "5 seconds", as indicated by application-transfer-time information denoted by No. 1 in the application-transfer-time DB 56 illustrated in FIG. 28".

In this case, in step 518 in FIG. 16, the server adjusts the partial-function permission condition to "30 minutes of start and end of meeting+5 seconds" and then determines whether or not this partial-function permission condition is satisfied.

In such a manner, the partial-function permission condition is adjusted considering the transfer time of an application. Thus, even when it takes time to transfer the application since the bandwidth of the network 16 is small, it is possible to significantly reduce the possibility that the partial-function permission condition is tightened by an amount corresponding to the transfer time of the application.

When the partial-function permission condition is a condition regarding the location, it is sufficient to calculate a distance by multiplying the transfer time of the application by the movement speed of the terminal and adjusting the partial-function permission condition according to the calculated distance. In such a case, the movement speed is added to the user-status DB 36, and the terminal is adapted to update it each time the movement speed is added and to transmit user-status information including the movement speed to the server as the status-change information. The server, in turn, adjusts the partial-function permission condition, based on the distance calculated from the received terminal movement speed and application transfer time.

For example, if the partial-function permission condition is "location is within 50 m from perimeter of client's place C", the transfer time of an application is 5 seconds, and the movement speed of the terminal is 1 m/s, then the distance calculated is 5 m, and thus the partial-function permission condition may be changed to "location is 55 m from perimeter of client's place C".

Fifth Embodiment

Next, a description will be given of a fifth embodiment of the disclosed technology. Portions that are the same as or similar to those in the first embodiment are denoted by the same reference numerals, descriptions thereof will not be given, and portions that are different from those in the first embodiment will be mainly described hereinafter.

In the fifth embodiment, a description will be given of a case in the functions of an application are restricted according to the number of users who use the application, that is, the number of terminals, in a range where execution of the application is permitted (for example, in an event venue).

Figure 31:
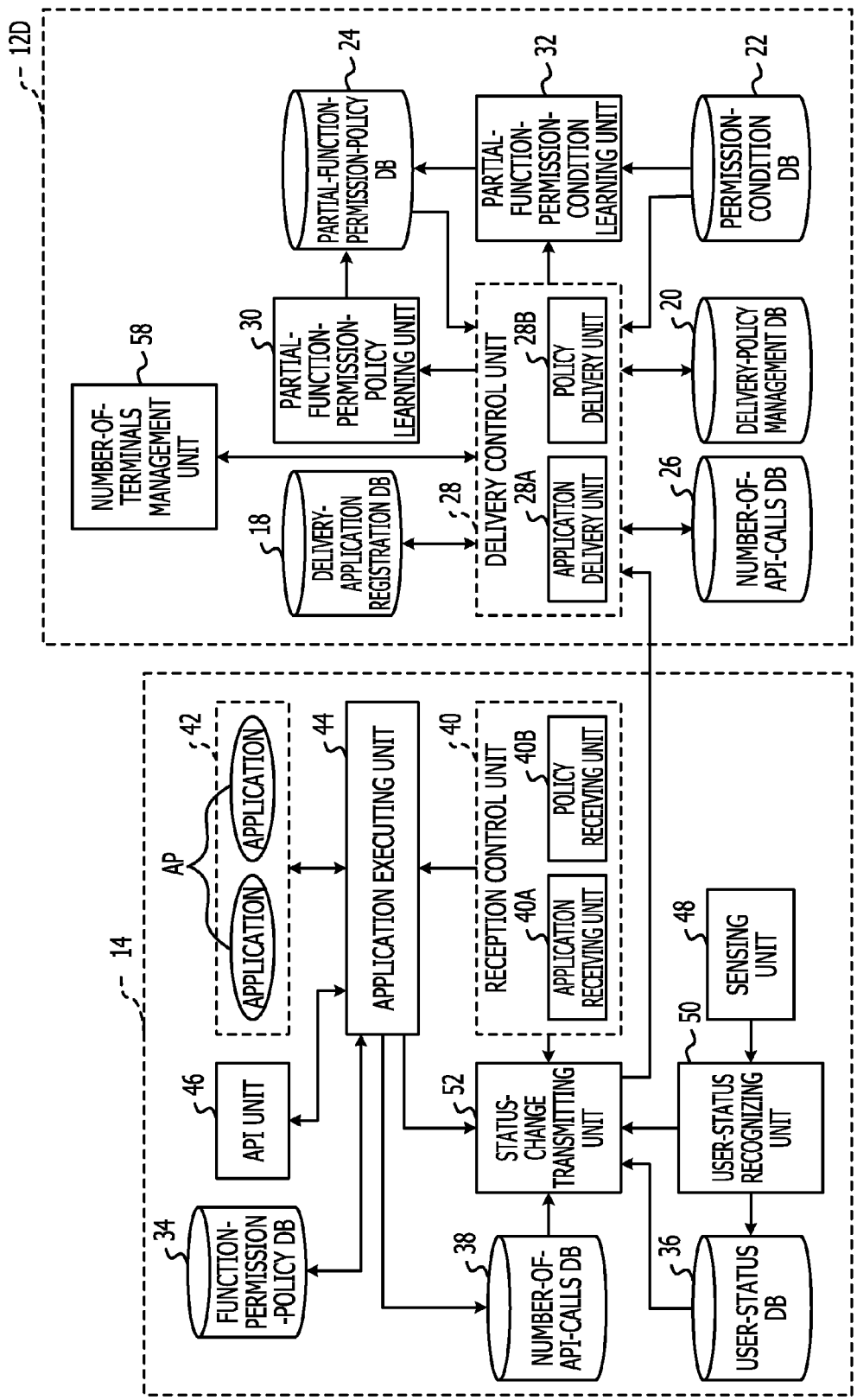
FIG. 31 is a block diagram of an application delivery apparatus and a communication terminal apparatus according to a fifth embodiment.

FIG. 31 illustrates an application delivery apparatus 12D according to a fifth embodiment. The application delivery apparatus 12D is different from the application delivery apparatus 12 in FIG. 2 in that a number-of-terminals management unit 58 is provided. Since other portions are substantially the same, descriptions thereof are not given hereinafter.

In the fifth embodiment, "status inside/outside event-X venue" is registered as a user-status type, and information indicating whether the terminal is located inside the venue or outside the venue is registered in the "current status", as indicated by user-status information denoted by No. 7 in the user-status DB 36 illustrated in FIG. 8.

The number-of-terminals management unit 58 counts the number of terminals whose "current status" in the user-status information included in the status-change information transmitted therefrom indicates "inside venue" and, stores the counted number in advance.

The permission condition is set to, for example, a condition that the enable-use condition of the "event-X application" is "location is inside event-X venue" and the all-function permission condition is "location is inside event-X venue", and the number of terminals is less than 1000", as denoted by No. 6 in the permission-condition DB 22 illustrated in FIG. 5.

The partial-function permission condition is also set to a condition "the number of terminals inside event-X venue is 1000 or more", as indicated by a partial-function permission condition denoted by No. 10 in the partial-function-permission-policy DB 24 illustrated in FIG. 6.

In this case, the number of terminals that are permitted to execute all of the functions of the event-X application in the event-X venue may be limited to less than 1000. In such a case, when the number of terminals reaches 1000 or more, only execution of one or some of the functions of the event-X application may be permitted.

Sixth Embodiment

Next, a description will be given of a sixth embodiment of the disclosed technology. Portions that are the same as or similar to those in the first embodiment are denoted by the same reference numerals, descriptions thereof will not be given, and portions that are different from those in the first embodiment will be mainly described hereinafter.

In the sixth embodiment, a description will be given of a case in which, when it is predicted that the number of users who enter the range where an application is executable, that is, the number of terminals in the range, is large, the partial-function permission condition is adjusted to avoid concentration of delivery of the application.

Figure 32:
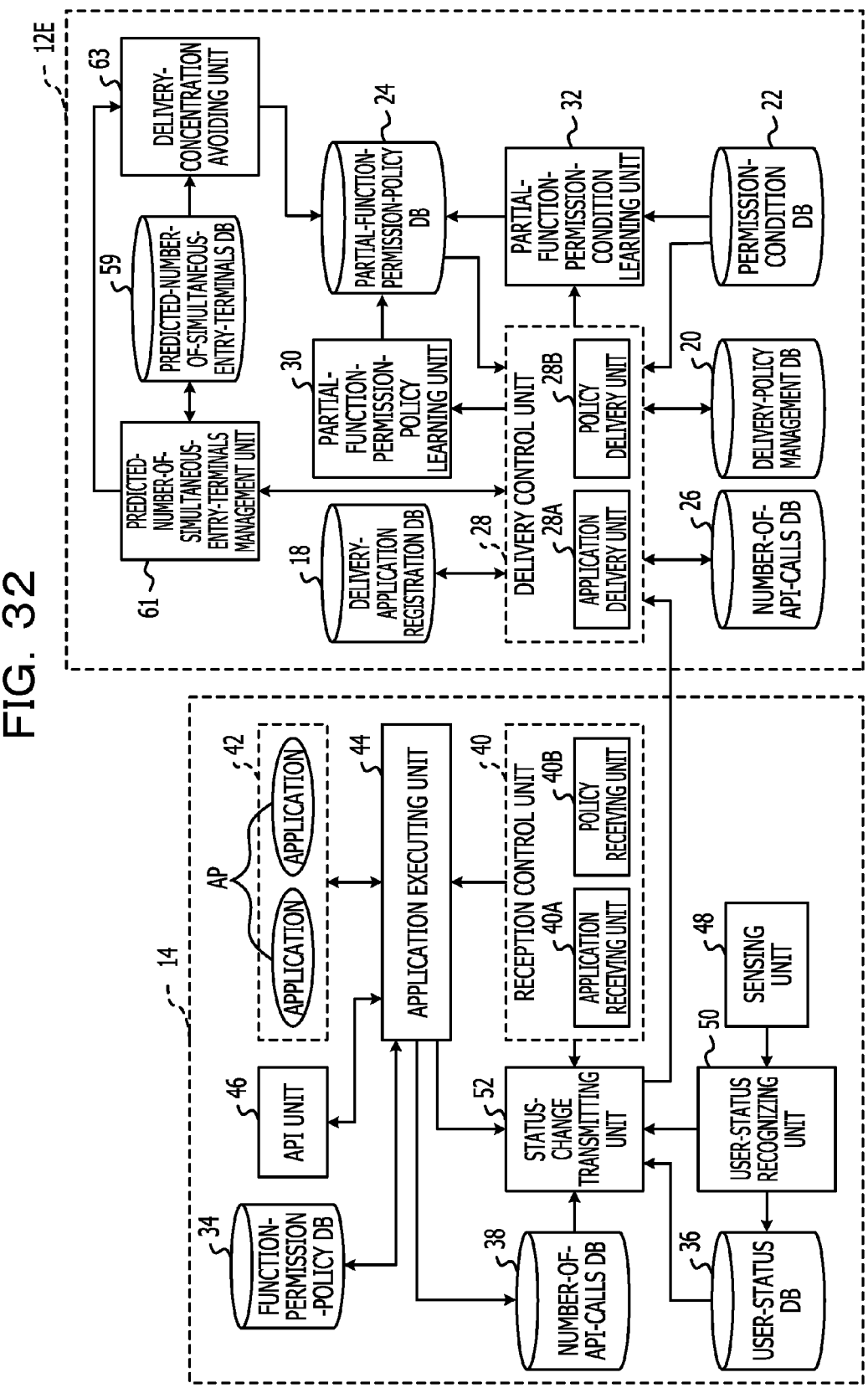
FIG. 32 is a block diagram of an application delivery apparatus and a communication terminal apparatus according to a sixth embodiment.

FIG. 32 illustrates an application delivery apparatus 12E according to the sixth embodiment. The application delivery apparatus 12E is different from the application delivery apparatus 12 illustrated in FIG. 2 in that a predicted-number-of-simultaneous-entry-terminals DB 59, a predicted-number-of-simultaneous-entry-terminals management unit 61, and a delivery-concentration avoiding unit 63 are provided. Since other portions are substantially the same, descriptions thereof are not given hereinafter. The predicted-number-of-simultaneous-entry-terminals management unit 61 is an example of a predicting unit in the disclosed technology.

As illustrated in FIG. 33, the predicted-number-of-simultaneous-entry-terminals DB 59 is a database in which predicted-number-of-simultaneous-entry-terminals information, including time slots, the predicted numbers of simultaneous-entry terminals, and terminal ID lists, is registered.

In the sixth embodiment, "predicted time of entry to event-X venue" is registered as the user-status type, and the predicted entry time of the terminal is registered in the "current status", as indicated by the user-status information denoted by No. 8 in the user-status DB 36 illustrated in FIG. 8.

In step 806 in FIG. 19, the terminal calculates a predicted time of entry to the event-X venue, based on the location of the event-X venue, the current location of the terminal, and the movement speed of the terminal, and determines whether or not the calculated predicted entry time has changed from the current status. When the predicted entry time has changed from the current status, the process proceeds to step 808 in which the current status is updated to the predicted entry time calculated in step 806.

Based on the predicted entry time in the user-status information included in the status-change information transmitted from each terminal, the predicted-number-of-simultaneous-entry-terminals management unit 61 counts the predicted number of simultaneous-entry terminals for each time slot and registers the counted number in the predicted-number-of-simultaneous-entry-terminals DB 59. In the example illustrated in FIG. 33, each time slot is set to 30 minutes, and a terminal ID list and a predicted number of simultaneous-entry terminals which is counted every 30 minutes are registered.

Based on the predicted-number-of-simultaneous-entry-terminals DB 59, the delivery-concentration avoiding unit 63 performs adjustment so that the times at which the application is delivered to the individual terminals vary, by adjusting the partial-function permission condition for each terminal in the terminal ID list in a time slot when the predicted number of simultaneous-entry terminals is larger than or equal to a predetermined threshold.

Figure 34:
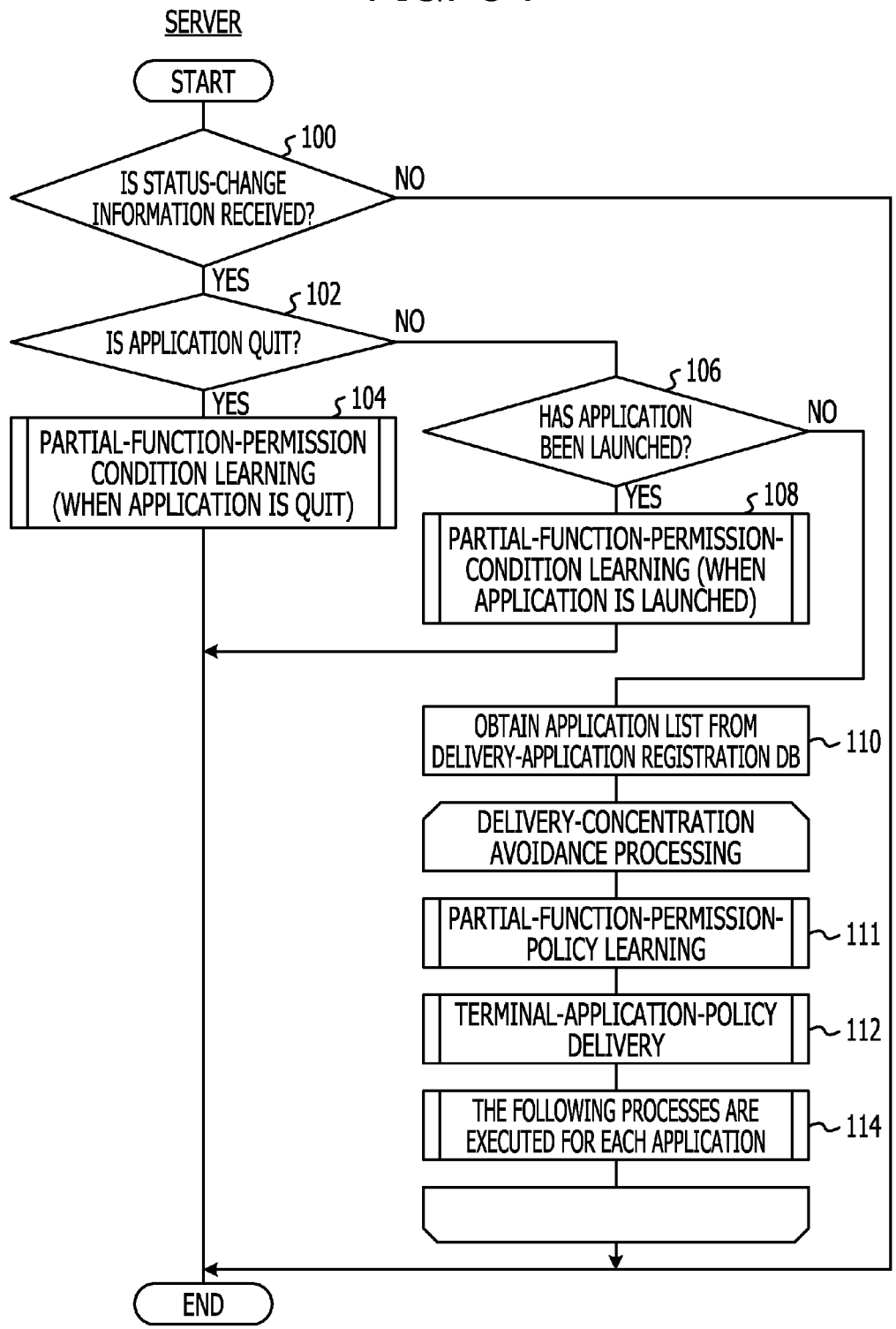
FIG. 34 is a flowchart of application delivery processing.

Next, a description will be given of an operation of the sixth embodiment. In the sixth embodiment, as illustrated in FIG. 34, the server executes delivery-concentration avoidance processing in step 111 between steps 110 and 112. Since other processes are substantially the same as those in the flowchart illustrated in FIG. 11, descriptions thereof are not given hereinafter. Next, details of the delivery-concentration avoidance processing in step 111 will be described with reference to FIG. 35.

In step 900, the policy delivery unit 28B requests the predicted-number-of-simultaneous-entry-terminals management unit 61 so as to update the predicted-number-of-simultaneous-entry-terminals DB 59.

In step 902, by referring to the predicted-number-of-simultaneous-entry-terminals DB 59, the predicted-number-of-simultaneous-entry-terminals management unit 61 determines whether or not the terminal from which the status-change information was received is included in the terminal ID list registered in the predicted-number-of-simultaneous-entry-terminals DB 59. When the terminal is included in the terminal ID list, the predicted-number-of-simultaneous-entry-terminals management unit 61 decrements the predicted number of simultaneous-entry terminals in the corresponding time slot. The predicted-number-of-simultaneous-entry-terminals management unit 61 also deletes, from the terminal ID list, the terminal ID of the terminal from which the status-change information was received.

In step 904, the predicted-number-of-simultaneous-entry-terminals management unit 61 increments the predicted number of simultaneous-entry terminals in the time slot corresponding to the predicted entry time of the terminal from which the status-change information was received and adds, to the terminal ID list, the ID of the terminal from which the status-change information was received.

In step 906, the delivery-concentration avoiding unit 63 sets the value of the location in the partial-function permission condition to a random value in a preset range and causes the set value to be reflected in the partial-function permission condition policy DB 24.

For example, it is assumed that, as denoted by No. 7 in the permission-condition DB 22 illustrated in FIG. 5, the enable-use condition and the all-function permission condition are "location is inside event-X venue".

In this case, as denoted by Nos. 11 to 13 in the partial-function-permission-policy DB 24 illustrated in FIG. 6, the partial-function permission condition for each terminal in the time slot when the predicted number of simultaneous-entry terminals is larger than or equal to the threshold is set to, for example, a randomly set range in a range of 100 m from the event-X venue. In the example in FIG. 6, the partial-function permission condition for the terminal T081 is set as "location is 53 m from event-X venue". The partial-function permission condition for a terminal T021 is set as "location is 39 m from event-X venue". The partial-function permission condition for a terminal T051 is set as "location is 68 m from event-X venue".

The process in step 906 is executed for each time slot when the predicted number of simultaneous-entry terminals is larger than or equal to the threshold and for each terminal in the terminal ID list in the time slot when the predicted number of simultaneous-entry terminals is larger than or equal to the threshold.

As described above, based on the predicted-number-of-simultaneous-entry-terminals DB 59, the delivery-concentration avoiding unit 63 varies the times at which an application is delivered to the terminals, by adjusting the partial-function permission condition for each terminal in the terminal ID list in the time slot when the predicted number of simultaneous-entry terminals is larger than or equal to the threshold. Thus, it is possible to reduce the number of terminals to which an application is simultaneously delivered among the group of terminals that simultaneously enter the event-X venue, and it is possible to reduce the load of delivery of the event-X application.

Although the above description has been given of a case in which the terminal determines whether or not the current status of the terminal has changed and transmits the status-change information to the server, the present technology is not limited thereto. For example, the arrangement may also be such that the terminal transmits the location or the like of the terminal to the server and the server determines whether or not the current status of the terminal has changed.

In addition, although a case in which the server determines the status of each terminal and delivers an application and policies thereto has been described above, the present technology is not limited thereto. For example, the arrangement may be such that an application and policies are initially delivered to each terminal and the terminal determines the status to execute the application. In such a case, even when offline, it is possible to execute the application.

Although the above description has been given of a case in which the partial-function permission condition from when an application is delivered until all of the functions of the application are permitted and the partial-function permission condition from when all of the functions of the application are permitted until the application is deleted are the same, different partial-function permission conditions may also be set.

For example, only the file read may be permitted from when an application is delivered until all of the functions of the application are permitted, and only the file write may be permitted from when all of the functions of the application are permitted until the application is deleted. For example, for an in-house application, the file read is permitted when the user leaves the building and is still on the premises, and is deleted when the user exists the premises. On the other hand, only the file read of the application is permitted from when the user from outside the premises enters the premises until he or she enters the building, and all of the functions of the application are permitted when he or she enters the building. As described above, even when an application is used at the same location, a function or functions that are permitted for use can be changed depending on a change in the status. This makes it possible to appropriately use the function(s) of the application in accordance with the status.

In addition, although the above description has been given of an example in which the application delivery program 70, which is an example of the application delivery program according to the disclosed technology, is pre-stored (pre-installed) in the storage unit 66, the present technology is not limited thereto. The application delivery program according to the disclosed technology may also be supplied in a form in which it is recorded to a recording medium, such as a compact disc-read only memory (CD-ROM) or digital versatile disc-read only memory (DVD). This also applies to the application execution program 90.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus configured to communicate with a terminal device, the information processing apparatus comprising:
a memory; and
a processor coupled to the memory and configured to
receive, from the terminal device, location information indicating a location at which the terminal apparatus is located,
transmit an application program, which includes a first function and a second function, to the terminal apparatus in accordance with the location information,
permit the terminal apparatus to execute the first function and the second function of the application program, when the location indicated by the location information is included in a first location range,
permit the terminal apparatus to execute the first function and prohibit the terminal apparatus to execute the second function, when the location indicated by the location information is not included in the first location range and is included in a second location range,
detect a quitting of the application program,
in a case in which the quitting of the application program is detected when the location indicated by the location information is included in the second location range, narrow the second location range, and
in a case in which the quitting of the application program is detected when the location indicated by the location information is outside of the second location range, extend the second location range.

2. The information processing apparatus according to claim 1,
wherein the second location range is a range outside the first location range.

3. The information processing apparatus according to claim 2,
wherein the processor is configured to hold history information regarding history of the location of the terminal device.

4. The information processing apparatus according to claim 1,
wherein, when the terminal apparatus launches or quits the application program in a first state in which the location is not included in the first location range and is included in the second location range, the processor is configured to change the second location range in accordance with the location information at the first state.

5. The information processing apparatus according to claim 1,
wherein the processor is configured to prohibit the terminal apparatus to execute the first function when a number of calls of the first function is smaller than a first threshold and to permit the terminal apparatus to execute the second function when a number of calls of the second function is larger than or equal to a second threshold, in a state in which the location is not included in the first location range and is included in the second location range.

6. The information processing apparatus according to claim 1,
wherein the processor is configured to calculate an exclusive switching condition to exclusively switch between the application program and another application program when the terminal apparatus is capable of executing the another application program in a state in which the location is included in the second location range.

7. The information processing apparatus according to claim 1,
wherein the processor is configured to hold number information indicating a number of terminal apparatuses that are present in a range where the application program is to be delivered.

8. The information processing apparatus according to claim 1,
wherein the processor is configured to
predict, for each time slot, a number of terminal apparatuses that enter a range where the application is to be delivered, and
change, when any time slot in which the number is larger than or equal to a predetermined threshold exists, the second location area for each of the terminal apparatuses so that the number in the time slot is smaller than the threshold.

9. The information processing apparatus according to claim 1, wherein
all of functions permitted in the second region are permitted in the first region, and
at least one of functions permitted in the first region is prohibited in the second region.

10. An information processing method executed by an information processing apparatus configured to be coupled to a terminal device, the information processing method comprising:
receiving, from the terminal device, location information indicating a location at which the terminal apparatus is located;
transmitting an application program, which includes a first function and a second function, to the terminal apparatus in accordance with the location information;
permitting the terminal apparatus to execute the first function and the second function of the application program, when the location indicated by the location information is included in a first location range;
permitting the terminal apparatus to execute the first function and prohibiting the terminal apparatus to execute the second function, when the location indicated by the location information is not included in the first location range and is included in a second location range;
detecting a quitting of the application program;
in a case in which the quitting of the application program is detected when the location indicated by the location information is included in the second location range, narrowing the second location range; and
in a case in which the quitting of the application program is detected when the location indicated by the location information is outside of the second location range, extending the second location range.

11. The information processing method according to claim 10,
wherein the second location range is a range outside the first location range.

12. The information processing method according to claim 11, the method further comprising:
holding history information regarding history of the location of the terminal device.

13. The information processing method according to claim 10, the method further comprising:
changing the second location range in accordance with the location information when the terminal apparatus launches or quits the application program in a state in which the location is not included in the first location range and is included in the second location range.

14. The information processing method according to claim 10, the method further comprising:
prohibiting the terminal apparatus to execute the first function when a number of calls of the first function is smaller than a first threshold; and
permitting the terminal apparatus to execute the second function when a number of calls of the second function is larger than or equal to a second threshold, in a state in which the location is not included in the first location range and is included in the second location range.

15. The information processing method according to claim 10, the method further comprising:
calculating an exclusive switching condition to exclusively switch between the application program and another application program when the terminal apparatus is capable of executing the another application program in a state in which the location is included in the second location range.

16. A non-transitory computer-readable storage medium storing a program that, when executed by a processor, causes the processor to execute a process, the process comprising:
receiving, from a terminal device, location information indicating a location at which the terminal apparatus is located;
transmitting an application program, which includes a first function and a second function, to the terminal apparatus in accordance with the location information;
permitting the terminal apparatus to execute the first function and the second function of the application program, when the location indicated by the location information is included in a first location range;
permitting the terminal apparatus to execute the first function and prohibiting the terminal apparatus to execute the second function, when the location indicated by the location information is not included in the first location range and is included in a second location range;
detecting a quitting of the application program;
in a case in which the quitting of the application program is detected when the location indicated by the location information is included in the second location range, narrowing the second location range; and
in a case in which the quitting of the application program is detected when the location indicated by the location information is outside of the second location range, extending the second location range.

17. An information processing apparatus configured to communicate with a terminal device, the information processing apparatus comprising:
- a memory; and
- a processor coupled to the memory and configured to:
  transmit an application program, which includes a first function and a second function, to the terminal apparatus in accordance with time information indicating a time,
  permit the terminal apparatus to execute the first function and the second function of the application program, when the time is included in a first time range,
  permit the terminal apparatus to execute the first function and prohibit the terminal apparatus to execute the second function, when the time is not included in the first time range and is included in a second time range,
  detect a quitting of the application program,
  in a case in which the quitting of the application program is detected when the time is included in the second time range, narrow the second time range, and
  in a case in which the quitting of the application program is detected when the time is not included in the second time range, extend the second time range.

18. The information processing apparatus according to claim 17, wherein the second time range is a range outside the first time range.

19. The information processing apparatus according to claim 17,
wherein, when the terminal apparatus launches or quits the application program in first state in which the time is not included in the first time range and is included in the second time range, the processor is configured to change the second time range in accordance with the time information at the first state.

20. The information processing apparatus according to claim 17,
wherein the processor is configured to prohibit the terminal apparatus to execute the first function when a number of calls of the first function is smaller than a first threshold and to permit the terminal apparatus to execute the second function when a number of calls of the second function is larger than or equal to a second threshold, in a state in which the time is not included in the first time range and is included in the second time range.

21. The information processing apparatus according to claim 17,
wherein the processor is configured to calculate an exclusive switching condition to exclusively switch between the application program and another application program when the terminal apparatus is capable of executing the another application program in a state in which the time is included in the second time range.

* * * * *